US011049053B2

(12) United States Patent
Nakashima

(10) Patent No.: US 11,049,053 B2
(45) Date of Patent: Jun. 29, 2021

(54) COMMUNICATION TERMINAL, SHARING SYSTEM, COMMUNICATION METHOD, AND NON-TRANSITORY RECORDING MEDIUM STORING PROGRAM

(71) Applicant: Ricoh Company, Ltd., Tokyo (JP)

(72) Inventor: Akihiro Nakashima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 187 days.

(21) Appl. No.: 16/355,778

(22) Filed: Mar. 17, 2019

(65) Prior Publication Data
US 2019/0303826 A1    Oct. 3, 2019

(30) Foreign Application Priority Data

Mar. 29, 2018 (JP) .............................. JP2018-065338
Mar. 7, 2019 (JP) .............................. JP2019-041794

(51) Int. Cl.
G06Q 10/06 (2012.01)
G06F 21/31 (2013.01)
H04L 29/08 (2006.01)

(52) U.S. Cl.
CPC ....... G06Q 10/06313 (2013.01); G06F 21/31 (2013.01); G06Q 10/06311 (2013.01); G06Q 10/06314 (2013.01); H04L 67/1076 (2013.01)

(58) Field of Classification Search
CPC ........... G06Q 10/00–50/00; H04L 1/00–69/00; G06F 1/00–40/00
USPC ................................................ 705/7.11–7.42
See application file for complete search history.

(56) References Cited

U.S. PATENT DOCUMENTS

| 10,565,891 B2* | 2/2020 | Nakashin | G06F 3/048 |
| 2003/0095113 A1* | 5/2003 | Ma | H04N 1/2166 345/175 |
| 2011/0279350 A1* | 11/2011 | Hutchinson | H04L 65/601 345/1.1 |

(Continued)

FOREIGN PATENT DOCUMENTS

JP    2016-105241    6/2016

OTHER PUBLICATIONS

Kunz, Andreas, Thomas Nescher, and Martin Kuchler. "Collaboard: a novel interactive electronic whiteboard for remote collaboration with people on content." 2010 International Conference on Cyberworlds. IEEE, 2010. (Year: 2010).*

(Continued)

Primary Examiner — Alan S Miller
(74) Attorney, Agent, or Firm — Xsensus LLP

(57) ABSTRACT

A communication terminal communicably connected to a sharing assistant server assisting use of one or more resources to be shared among a plurality of users is provided. The communication terminal includes circuitry to control a display to display, on a screen, an image relating to an event being executed by one or more users sharing one or more of the resources. The circuitry receives identification of an area identified on the screen. The identified area includes the image. The circuitry transmits, to the sharing assistant server, data of the image included within the identified area, as image data indicating content of an action item generated in the event being executed, in association with event identification information identifying the event being executed.

10 Claims, 33 Drawing Sheets

(56) References Cited

U.S. PATENT DOCUMENTS

| | | | |
|---|---|---|---|
| 2012/0235934 A1* | 9/2012 | Kawasaki | G06F 3/041 |
| | | | 345/173 |
| 2013/0060594 A1* | 3/2013 | Motoyama | G06Q 10/1097 |
| | | | 705/7.21 |
| 2015/0082241 A1* | 3/2015 | Kang | H04N 7/15 |
| | | | 715/803 |
| 2015/0121232 A1* | 4/2015 | Edwardson | G06F 40/166 |
| | | | 715/732 |
| 2017/0220245 A1* | 8/2017 | Ding | G06F 3/017 |
| 2017/0249294 A1 | 8/2017 | Emori | |
| 2017/0339370 A1* | 11/2017 | Inoue | G06F 3/0488 |
| 2018/0268819 A1 | 9/2018 | Nakashima | |
| 2019/0303826 A1* | 10/2019 | Nakashima | G06Q 10/06314 |

OTHER PUBLICATIONS

Gumienny, Raja, et al. "Tele-board: Enabling efficient collaboration in digital design spaces." Proceedings of the 2011 15th International Conference on Computer Supported Cooperative Work in Design (CSCWD). IEEE, 2011. (Year: 2011).*

Nescher, Thomas, and Andreas Kunz. "An interactive whiteboard for immersive telecollaboration." The Visual Computer 27.4 (2011): 311-320. (Year: 2011).*

* cited by examiner

| USER ID | USER NAME | ORGANIZATION ID | PASSWORD |
|---|---|---|---|
| u0001 | TARO RICOH | o1001 | p9991 |
| u0002 | GORO KONDO | o1002 | p9992 |
| ... | ... | ... | ... |

FIG. 8B

| ORGANIZATION ID | ACCESS ID | ACCESS PASSWORD |
|---|---|---|
| o1001 | a1001 | p1001 |
| ... | ... | ... |

FIG. 8C

PLANNED EVENT ID: pe0001, EXECUTED EVENT ID: ee0001

| ORGANIZATION ID | USER ID OF USER WHO MAKES RESERVATION | USER NAME OF USER WHO MAKES RESERVATION | SCHEDULED START DATE AND TIME | SCHEDULED END DATE AND TIME | EVENT NAME | USER ID OF PARTICIPANT | PARTICIPATION | USER NAME OF PARTICIPANT |
|---|---|---|---|---|---|---|---|---|
| o1001 | u0001 | TARO RICOH | 9:00 | 10:00 | POLICY MAKING MEETING | u0000 | YES | KOKUBAN DENSHI |
| | | | | | | u0002 | YES | GORO KONDO |
| | | | | | | u0003 | YES | YOSHIO YAMASHITA |

| PARTICIPATION |
|---|
| YES |

FIG. 9A

| PROJECT ID | EXECUTED EVENT ID |
|---|---|
| p0001 | ee0001, ee0011, ee0021 |
| p0002 | ee0002, ee0012 |
| ... | ... |

FIG. 9B

EXECUTED EVENT ID: ee0001

| ACTION ITEM ID | USER ID OF EXECUTOR OF ACTION ITEM | DUE DATE | URL OF IMAGE DATA |
|---|---|---|---|
| a0001 | u0003 | 2018/1/30 | http://... |
| ... | ... | ... | ... |

FIG. 10A

| USER ID | ORGANIZATION ID | PASSWORD |
|---|---|---|
| u0001 | o1001 | p9991 |
| u0002 | o1002 | p9992 |
| ... | ... | ... |

FIG. 10B

ORGANIZATION ID: o1001

| USER ID | USER NAME |
|---|---|
| u0001 | TARO RICOH |
| u0002 | GORO KONDO |
| u0003 | YOSHIO YAMASHITA |
| u0004 | Jim Berger |
| ... | ... |

FIG. 10C

ORGANIZATION ID: o1001

| SHARED RESOURCE ID | SHARED RESOURCE NAME |
|---|---|
| s1001 | MEETING ROOM X |
| s1002 | MEETING ROOM Y |
| ... | ... |

FIG. 11A

ORGANIZATION ID: o1001

| SHARED RESOURCE ID | SHARED RESOURCE NAME | USER ID OF COMMUNI-CATION TERMINAL | USER NAME OF USER WHO MAKES RESERVATION | SCHEDULED USE START DATE AND TIME | SCHEDULED USE END DATE AND TIME | EVENT NAME |
|---|---|---|---|---|---|---|
| s1001 | MEETING ROOM X | u0000 | u0001 | 2018/1/15 9:00 | 2018/1/15 10:00 | POLICY MAKING MEETING |
| s1001 | MEETING ROOM X | u0000 | u0004 | 2018/1/15 10:00 | 2018/1/15 11:00 | REGULAR MEETING |
| s1001 | MEETING ROOM X | u0000 | u0002 | 2018/1/15 10:11 | 2018/1/15 15:00 | MANAGEMENT MEETING |
| s1002 | MEETING ROOM Y | u1000 | u0005 | 2018/1/15 9:00 | 2018/1/15 10:00 | NEW PRODUCT DEVELOPMENT MEETING |
| ... | ... | ... | ... | ... | ... | ... |

FIG. 11B

PLANNED EVENT ID: pa0001

| ORGANIZA-TION ID | USER ID | USER NAME | SCHEDULED EVENT START DATE AND TIME | SCHEDULED EVENT END DATE AND TIME | EVENT NAME | MEMO |
|---|---|---|---|---|---|---|
| o1001 | u0000 | KOKUBAN DENSHI | 2018/1/15 9:00 | 2018/1/15 10:00 | POLICY MAKING MEETING | ... |
| o1001 | u0001 | TARO RICOH | 2018/1/15 9:00 | 2018/1/15 10:00 | POLICY MAKING MEETING | ... |
| o1001 | u0002 | GORO KONDO | 2018/1/15 9:00 | 2018/1/15 10:00 | POLICY MAKING MEETING | ... |
| o1001 | u0003 | YOSHIO YAMASHITA | 2018/1/15 9:00 | 2018/1/15 10:00 | POLICY MAKING MEETING | ... |

FIG. 12A

| ACCESS ID | ACCESS PASSWORD |
|---|---|
| a1001 | p1001 |
| a1002 | p1002 |
| ... | ... |

FIG. 12B

ORGANIZATION ID: o1001

| PROJECT ID | PROJECT NAME | USER ID OF PROJECT MEMBER |
|---|---|---|
| p0001 | NEXT YEAR'S POLICY | u0000, u0001, u0002, u0003 |
| p0002 | PRODUCT DEVELOPMENT PROJECT | u0000, u0004, u0005 |
| p0003 | NEW PRODUCT DEVELOPMENT | u0000, u0005, u0006, u0007 |
| ... | ... | ... |

FIG. 12C

EXECUTED EVENT ID: ee0001

| ACTION ITEM ID | USER ID OF EXECUTOR OF ACTION ITEM | PROJECT ID | DUE DATE | STORAGE LOCATION OF IMAGE DATA |
|---|---|---|---|---|
| a0001 | u0003 | p0001 | 2018/1/30 | c://... |
| ... | ... | ... | ... | ... |

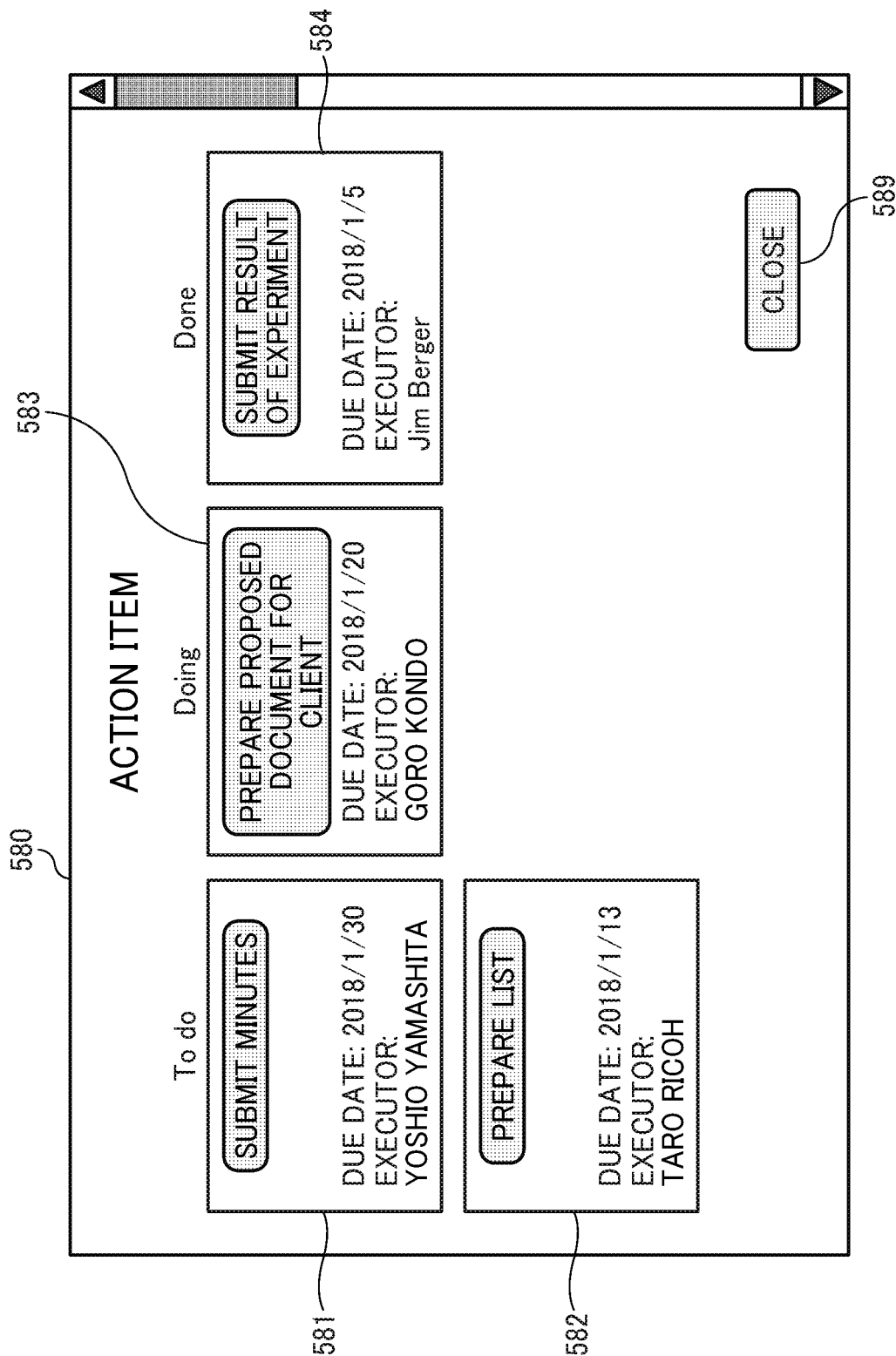

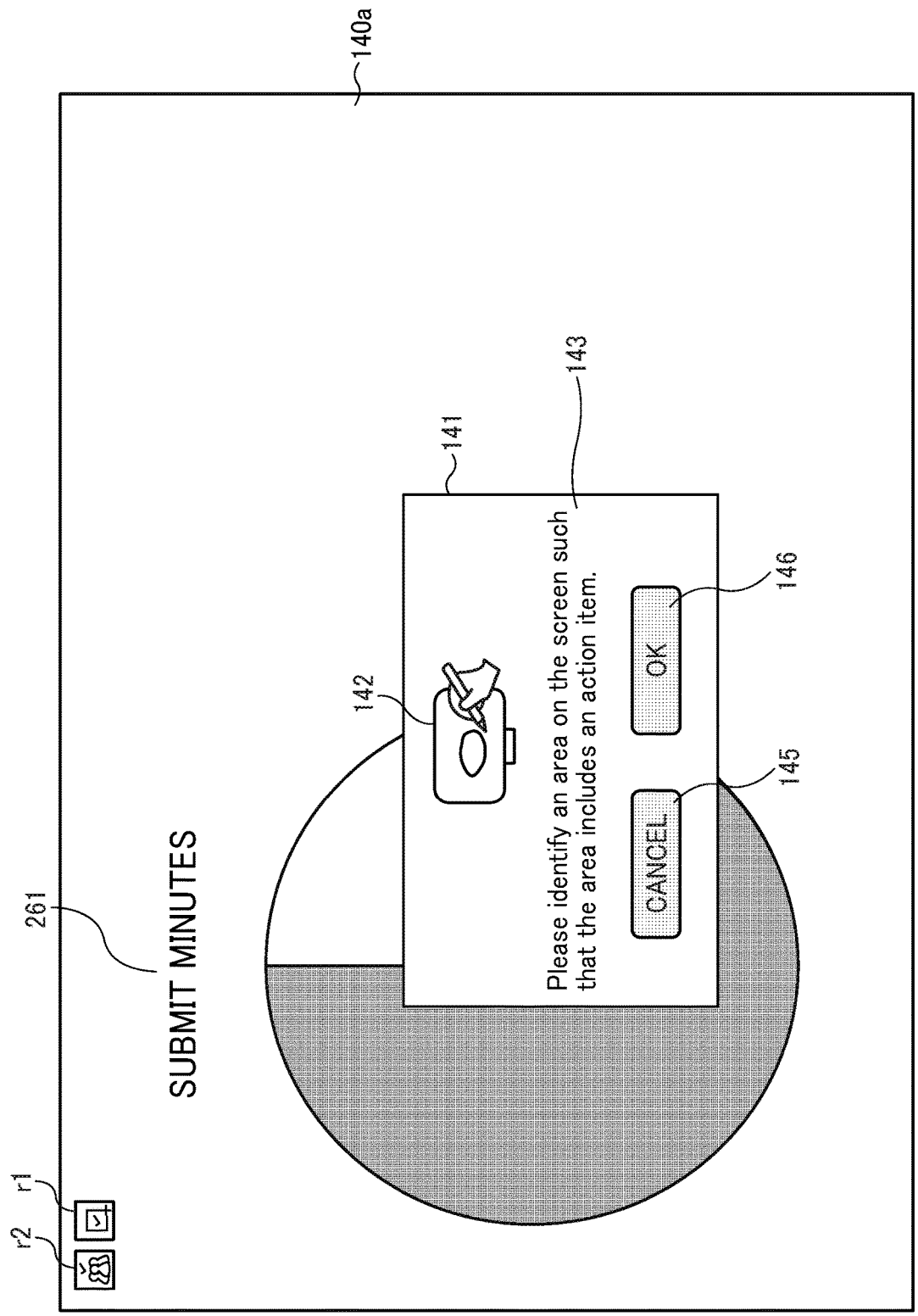

COMMUNICATION TERMINAL, SHARING SYSTEM, COMMUNICATION METHOD, AND NON-TRANSITORY RECORDING MEDIUM STORING PROGRAM

CROSS-REFERENCE TO RELATED APPLICATIONS

This patent application is based on and claims priority pursuant to 35 U.S.C. § 119(a) to Japanese Patent Application Nos. 2018-065338, filed on Mar. 29, 2018, and 2019-041794, filed on Mar. 7, 2019, in the Japan Patent Office, the entire disclosures of which are hereby incorporated by reference herein.

BACKGROUND

Technical Field

Embodiments of the present disclosure relate to a communication terminal, a sharing system, a communication method, and a non-transitory recording medium.

Related Art

In recent years, at conferences or meeting in corporations, educational institutions, government institutions, and the like, electronic whiteboards are used. The electronic whiteboard displays a background image on a large-type display and allows users to draw stroke images such as texts, numbers, figures, or the like on the background image.

In an event such as a conference or meeting, an action item is generated. In order to make sure that the action item generated in the event is executed, the user accesses a server or the like managing a schedule (plan, date, etc.) by using a personal computer (PC) or the like and registers the action item.

SUMMARY

An exemplary embodiment of the present disclosure includes a communication terminal communicably connected to a sharing assistant server assisting use of one or more resources to be shared among a plurality of users. The communication terminal includes circuitry to control a display to display, on a screen, an image relating to an event being executed by one or more users sharing one or more of the resources. The circuitry receives identification of an area identified on the screen. The identified area includes the image. The circuitry transmits, to the sharing assistant server, data of the image included within the identified area, as image data indicating content of an action item generated in the event being executed, in association with event identification information identifying the event being executed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8A is a conceptual diagram illustrating a user authentication management table, according to an embodiment of the disclosure;

FIG. 8B is a conceptual diagram illustrating an access management table, according to an embodiment of the disclosure;

FIG. 8C is a conceptual diagram illustrating a plan management table, according to an embodiment of the disclosure;

FIG. 9A is a conceptual diagram illustrating an executed event management table, according to an embodiment of the disclosure;

FIG. 9B is a conceptual diagram illustrating an action item management table, according to an embodiment of the disclosure;

FIG. 10A is a conceptual diagram illustrating a user authentication management table, according to an embodiment of the disclosure;

FIG. 10B is a conceptual diagram illustrating a user management table, according to an embodiment of the disclosure;

FIG. 10C is a conceptual diagram illustrating a shared resource management table, according to an embodiment of the disclosure;

FIG. 11A is a conceptual diagram illustrating a shared resource reservation management table, according to an embodiment of the disclosure;

FIG. 11B is a conceptual diagram illustrating an event management table, according to an embodiment of the disclosure;

FIG. 12A is a conceptual diagram illustrating a shared resource reservation management table, according to an embodiment of the disclosure;

FIG. 12B is a conceptual diagram illustrating a project member management table, according to an embodiment of the disclosure;

FIG. 12C is a conceptual diagram illustrating an action item management table, according to an embodiment of the disclosure;

FIG. 31 is an illustration of an action item screen displayed using a PC, according to an embodiment of the disclosure; and FIG. 32 is an illustration of a screen indicating a confirmation screen to start identifying an action item, according to an embodiment of the disclosure.

Figure 1:
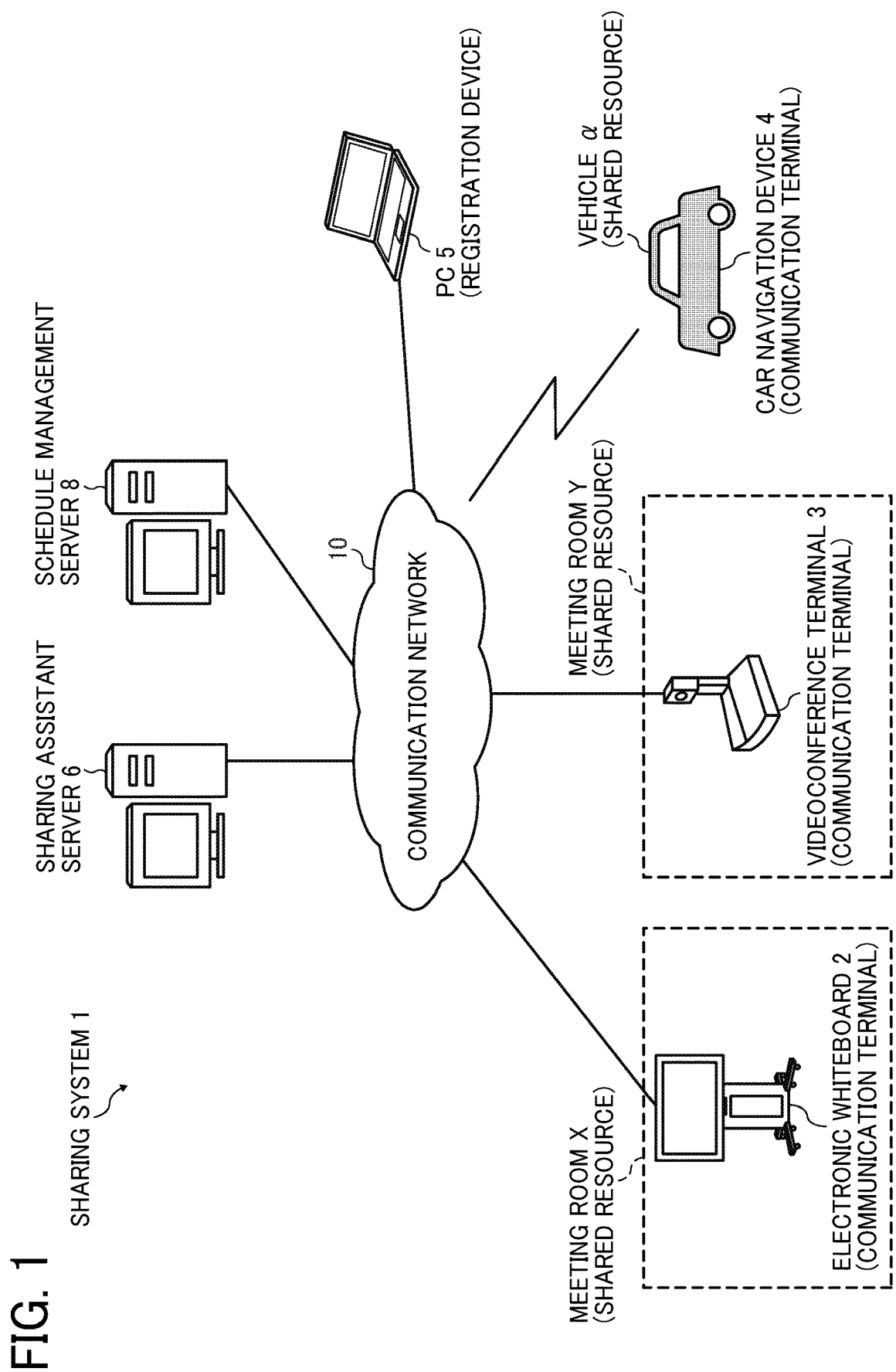
FIG. 1 is a schematic diagram illustrating a configuration of a sharing system according to an embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Referring to the drawings, a sharing system 1 is described according to one or more embodiments. In this disclosure, the "electronic file" may be referred to as the "file".

Overview of System Configuration

First, an overview of a configuration of the sharing system 1 is described. FIG. 1 is a schematic diagram illustrating an overview of the sharing system 1 according to one or more embodiments.

As illustrated in FIG. 1, the sharing system 1 of the embodiment includes an electronic whiteboard 2, a videoconference terminal 3, a car navigation device 4, a personal computer (PC) 5, a sharing assistant server 6, and a schedule management server 8.

The electronic whiteboard 2, the videoconference terminal 3, the car navigation device 4, the PC 5, the sharing assistant server 6, and the schedule management server 8 can communicate each other through a communication network 10. The communication network 10 is implemented by the Internet, a mobile communication network, and a local area network (LAN), for example. The communication network 10 may include, in addition to a wired network, a wireless network in compliance with such as 3rd Generation (3G), Worldwide Interoperability for Microwave Access (WiMAX), Long Term Evolution (LTE), and the like.

The electronic whiteboard 2 is used in a meeting room X. The videoconference terminal 3 is used in a meeting room Y. The car navigation device 4 is provided in a vehicle α. The vehicle α is a vehicle for a car sharing, namely the vehicle α is to be shared by a plurality of users. The vehicle includes a car, a motorcycle, a bicycle, and a wheel chair, for example. In this disclosure, a resource can be a target for reservation by each user.

The "shared resource", which may be also referred to as the "resource to be shared", includes a resource, a service, a space (room), a place, and information each of which is shared to be used by a plurality of users, groups of people, or the like, for example. The meeting room X, the meeting room Y, and the vehicle α are examples of the shared resources that are to be shared by the plurality of users. Examples of information include, but not limited to, information on an account assigned to the user, with the user being more than one individual person. For example, an organization may only be assigned with one account that allows any user in the organization to use a specific service provided on the Internet. In such case, information on such an account, such as a user name and a password, is assumed to be a resource that can be shared among a plurality of users in the organization.

The electronic whiteboard 2, videoconference terminal 3, and car navigation device 4, are each an example of a communication terminal. "Communication terminal" is, for example, a terminal that can be used by a user by signing in (see S32, which is described later). Examples of the communication terminal provided in the vehicle α may not only include the car navigation device 4, but also a smart phone or a smart watch installed with such as a car navigation application.

The PC 5 is an information processing device and is an example of a registration device used by a user for registering, to the schedule management server 8, a reservation for use of each shared resource and an event scheduled by the user. The event is, for example, a meeting, a conference, a gathering, an assembly, a counseling, a driving, a riding, or the like.

The sharing assistant server 6 is a computer and remotely assists each communication terminal for sharing the shared resource.

The schedule management server 8, which is implemented by one or more computers, manages the reservation for using each resource or the schedule of each user.

Hardware Configuration

Referring to FIGS. 2 to 5, a hardware configuration of the apparatus or terminal in the sharing system 1 is described according to the embodiment.

Hardware Configuration of Electronic Whiteboard

Figure 2:
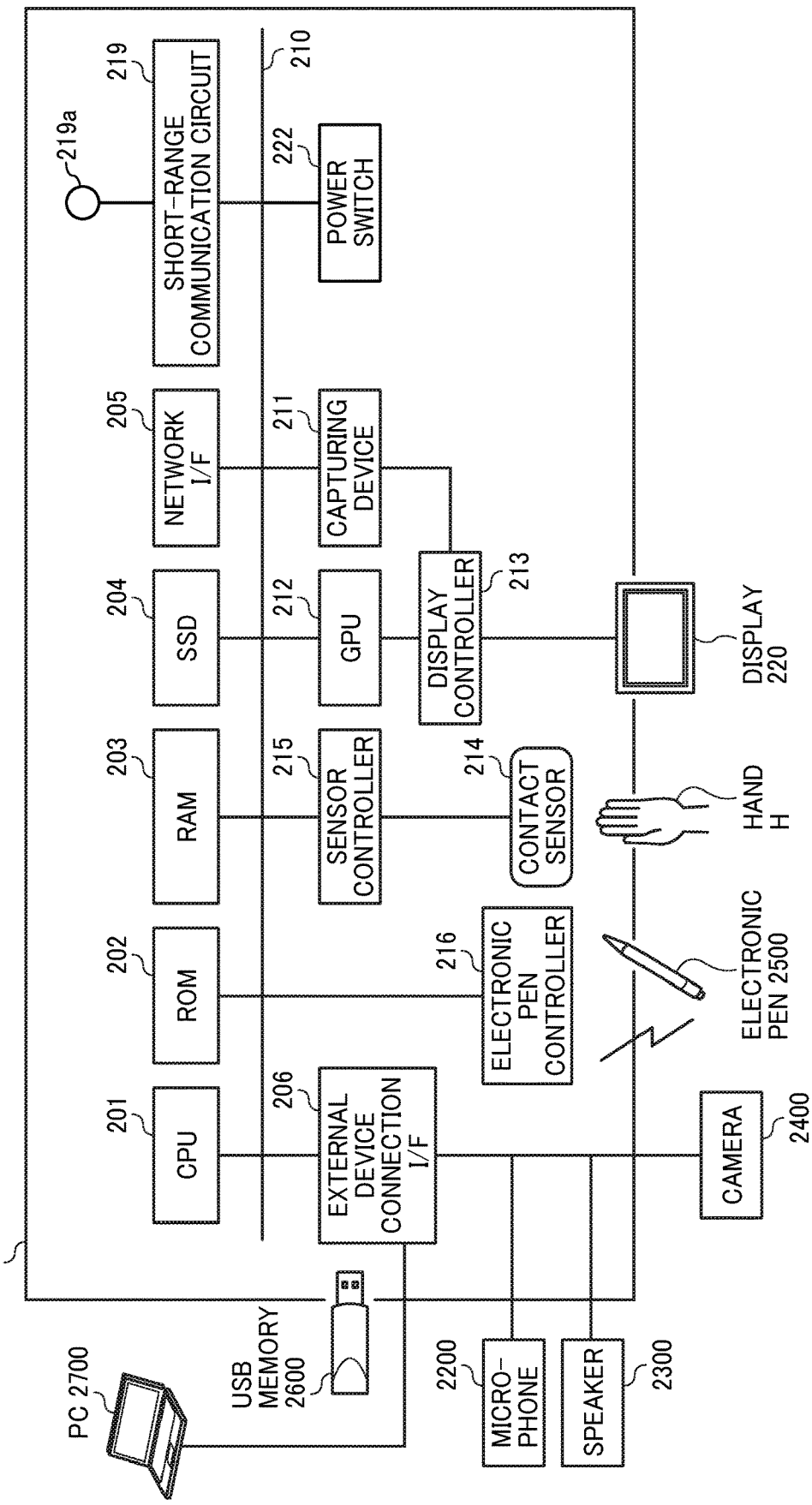
FIG. 2 is a schematic block diagram illustrating a hardware configuration of an electronic whiteboard, according to an embodiment of the disclosure.

FIG. 2 is a schematic block diagram illustrating a hardware configuration of the electronic whiteboard 2 according to the present embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls the entire operation of the electronic whiteboard 2. The ROM 202 stores programs including an Initial Program Loader (IPL) to boot the CPU 201. The RAM 203 is used as a work area for the CPU 201. The SSD 204 stores various types of data such as a control program for the electronic whiteboard 2. The network I/F 205 controls communication established with an external device through the communication network 10. The external device connection I/F 206 controls communication with a Universal Serial Bus (USB) memory 2600, and external devices, which includes a camera 2400, a speaker 2300, and a microphone 2200.

The electronic whiteboard 2 further includes a capturing device 211, a graphics processing unit (GPU) 212, a display controller 213, a contact sensor 214, a sensor controller 215, an electronic pen controller 216, a short-range communication circuit 219, an antenna 219a for the short-range communication circuit 219, and a power switch 222.

The capturing device 211 acquires image data of an image displayed on a display 220 under control of the display controller 213, and stores the image data in the RAM 203 or the like. The GPU 212 is a semiconductor chip dedicated to graphics. The display controller 213 controls display of an image processed at the GPU 212 for outputting on a display 220 of the electronic whiteboard 2. The contact sensor 214 detects a touch made onto the display 220 with an electronic pen 2500 or a user's hand H. The sensor controller 215 controls the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame surrounding the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by using the tip or bottom of the electronic pen 2500 to the display 220. The short-range communication circuit 219 is a communication circuit that communicates in compliance with the near field communication (NFC), the Bluetooth (registered trademark) or the like. The power switch 222 turns on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

Hardware Configuration of Videoconference Terminal

Figure 3:
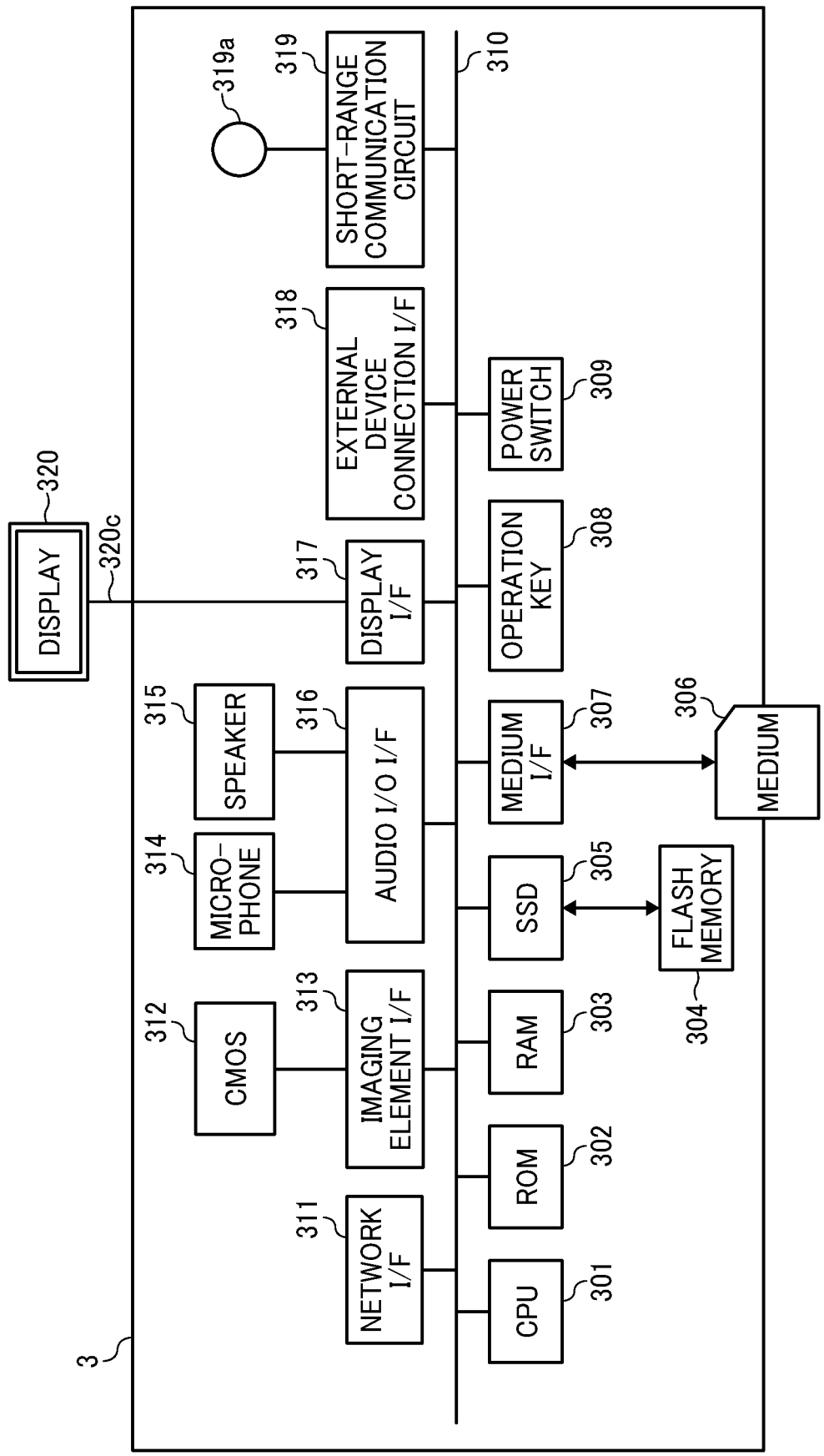
FIG. 3 is a schematic block diagram illustrating a hardware configuration of a videoconference terminal, according to an embodiment of the disclosure.

FIG. 3 is a schematic block diagram illustrating an example of a hardware configuration of the videoconference terminal 3 according to the present embodiment. As illustrated in FIG. 3, the videoconference terminal 3 includes a CPU 301, a ROM 302, a RAM 303, a flash memory 304, an SSD 305, a medium I/F 307, an operation key 308, a power switch 309, a bus line 310, a network I/F 311, a complementary metal oxide semiconductor (CMOS) sensor 312, an imaging element I/F 313, a microphone 314, a speaker 315, an audio input/output (I/O) I/F 316, a display I/F 317, an external device connection I/F 318, a short-range communication circuit 319, and an antenna 319a for the short-range communication circuit 319.

The CPU 301 controls the entire operation of the videoconference terminal 3. The ROM 302 stores programs including an IPL to boot the CPU 301. The RAM 303 is used as a work area for the CPU 301. The flash memory 304 stores various types of data such as a communication control program, image data, and audio data. The SSD 305 controls reading or writing of various types of data from or to the flash memory 304 under control of the CPU 301. In alternative to the SSD, a hard disk drive (HDD) may be used. The medium I/F 307 reads and/or writes (stores) data from and/or to a recording medium 306 such as a flash memory. The operation key 308 is operated according to a user input indicating an instruction in selecting a destination of a communication from the videoconference terminal 3, for example. The power switch 309 is a switch that receives an instruction to turn on or off the power of the videoconference terminal 3.

The network I/F 311 allows communication of data with an external device through the communication network 10 such as the Internet. The CMOS sensor 312 is an example of a built-in imaging device capable of capturing a subject under control of the CPU 301. The imaging element I/F 313 is a circuit that controls driving of the CMOS sensor 312. The microphone 314 is an example of a built-in sound collecting device capable of inputting sounds. The audio I/O I/F 316 is a circuit for inputting or outputting an audio signal to the microphone 314 or from the speaker 315 under control of the CPU 301. The display I/F 317 is a circuit for transmitting image data to an external display 320 under control of the CPU 301. The external device connection I/F 318 is an interface that connects the videoconference terminal 3 to various external devices. The short-range communication circuit 319 is a communication circuit that communicates in compliance with the NFC, the Bluetooth, and the like.

The bus line 310 is an address bus or a data bus, which electrically connects the elements in FIG. 3 such as the CPU 301.

The display 320 may be a liquid crystal or organic electroluminescence (EL) display that displays an image of a subject, an operation icon, or the like. The display 320 is connected to the display I/F 317 by a cable 320c. The cable 320c may be an analog red green blue (RGB) (video graphic array (VGA)) signal cable, a component video cable, a high-definition multimedia interface (HDMI) (registered trademark) signal cable, or a digital video interactive (DVI) signal cable.

As an alternative to the CMOS sensor 312, another imaging element such as a charge-coupled device (CCD) sensor may be used. The external device connection I/F 318 is capable of connecting an external device such as an external camera, an external microphone, and an external speaker through a USB cable or the like. When an external camera is connected, the external camera is driven in preference to the built-in CMOS sensor 312 under control of the CPU 301. Similarly, in the case where an external microphone is connected or an external speaker is connected, the external microphone or the external speaker is driven in preference to the built-in microphone 314 or the built-in speaker 315 under control of the CPU 301.

The recording medium 306 is removable from the videoconference terminal 3. The recording medium 306 is not limited to the flash memory 304. The recording medium 306 may be any non-volatile memory that reads or writes data under control of the CPU 301. In some embodiments, an electrically erasable and programmable read-only memory (EEPROM) is used.

Hardware Configuration of Car Navigation Device

Figure 4:
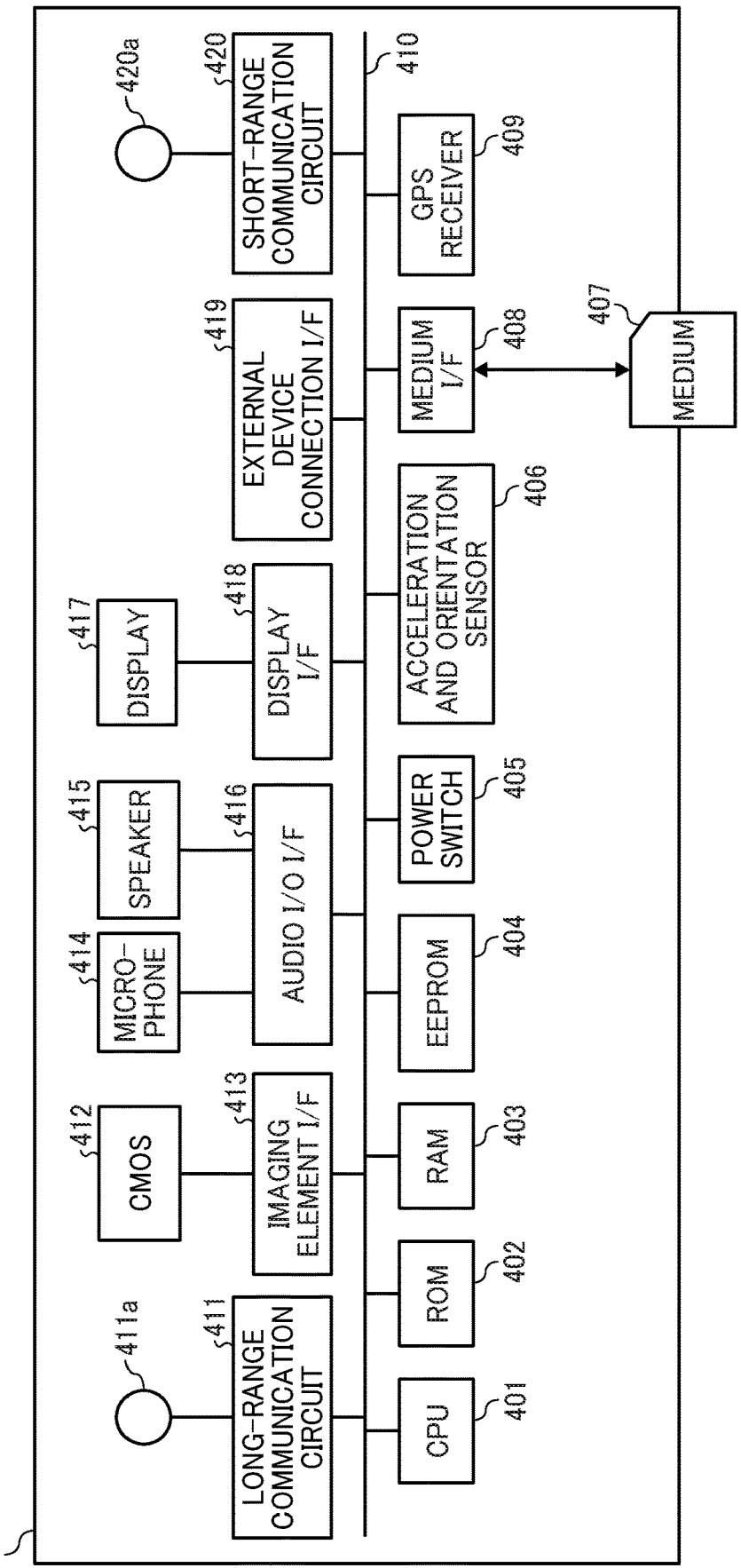
FIG. 4 is a schematic block diagram illustrating a hardware configuration of a car navigation device according to an embodiment of the disclosure.

FIG. 4 is a schematic block diagram illustrating an example of a hardware configuration of the car navigation device 4 according to the present embodiment. As illustrated in FIG. 4, the car navigation device 4 includes a CPU 401, a ROM 402, a RAM 403, an EEPROM 404, a power switch 405, an acceleration and orientation sensor 406, a medium I/F 408, and a global positioning system (GPS) receiver 409.

The CPU 401 controls the entire operation of the car navigation device 4. The ROM 402 stores programs including an IPL to boot the CPU 401. The RAM 403 is used as a work area for the CPU 401. The EEPROM 404 reads or writes various types of data such as a control program for the car navigation device 4 under control of the CPU 401. The power switch 405 is a switch that turns on or off the power of the car navigation device 4. The acceleration and orientation sensor 406 includes various sensors such as an acceleration sensor and an electromagnetic compass or gyrocompass, which detects geomagnetism. The medium I/F 408 controls reading or writing of data with respect to a recording medium 407 such as a flash memory. The GPS receiver 409 receives a GPS signal from a GPS satellite.

The car navigation device 4 further includes a long-range communication circuit 411, an antenna 411a for the long-range communication circuit 411, a CMOS sensor 412, an imaging element I/F 413, a microphone 414, a speaker 415, an audio I/O I/F 416, a display 417, a display I/F 418, an external device connection I/F 419, a short-range communication circuit 420, and an antenna 420a for the short-range communication circuit 420.

The long-range communication circuit 411 is a circuit, which receives traffic jam information, road construction information, traffic accident information and the like provided from an infrastructure system external to the vehicle, and transmits information on the location of the vehicle, life-saving signals, etc. in the case of emergency back to the infrastructure system. Examples of such infrastructure include, but not limited to, a road information guidance system such as a Vehicle Information and Communication System (VICS) (registered trademark) system. The CMOS sensor 412 is an example of a built-in imaging device capable of capturing a subject under control of the CPU 401. The imaging element I/F 413 is a circuit that controls driving of the CMOS sensor 412. The microphone 414 is an example of a built-in sound collecting device, which is a built-in type, capable of inputting audio under control of the CPU 401. The audio I/O I/F 416 is a circuit for inputting and outputting an audio signal between the microphone 414 and the speaker 415 under control of the CPU 401. The display 417 is an example of a display unit, such as a liquid crystal or organic electroluminescence (EL) display that displays an image of subject, and/or an operation icon, for example. The display 417 has a function of a touch panel. The touch panel is an example of input device that enables the user to input a user instruction for operating the car navigation device 4. The display I/F 418 is a circuit for transmitting display data to the display 417 under control of the CPU 401. The external device connection I/F 419 is an interface that connects the car navigation device 4 to various external devices. The short-range communication circuit 420 is a communication circuit that communicates in compliance with, for example, an NFC or the Bluetooth. The car navigation device 4 is further provided with a bus line 410. The bus line 410 is an address bus or a data bus that electrically connects the elements illustrated in FIG. 4, such as the CPU 401, to each other.

Hardware Configurations of PC and Server

Figure 5:
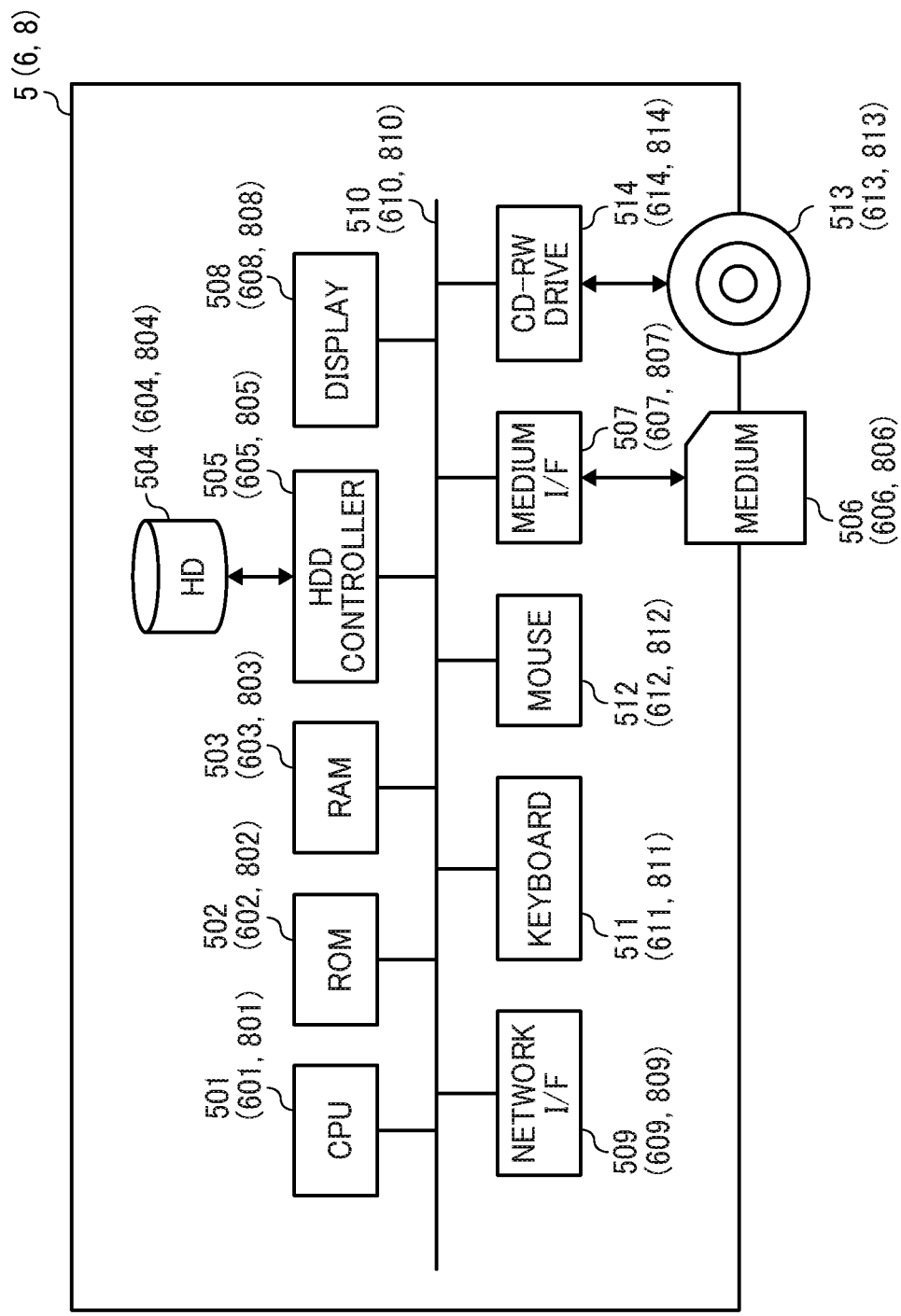
FIG. 5 is a schematic block diagram illustrating a hardware configuration of each of a personal computer (PC) and servers according to an embodiment of the disclosure.

FIG. 5 is a schematic block diagram illustrating a hardware configuration of each of the PC 5 and the servers 6 and 8.

As illustrated in FIG. 5, the PC 5, which is implemented by a computer, includes a CPU 501, a ROM 502, a RAM 503, a hard disk (HD) 504, a hard disk drive (HDD) controller 505, a medium I/F 507, a display 508, a network I/F 509, a keyboard 511, a mouse 512, a compact disc rewritable (CD-RW) drive 514, and a bus line 510.

The CPU 501 controls the entire operation of the PC 5. The ROM 502 stores programs including an IPL to boot the CPU 501. The RAM 503 is used as a work area for the CPU 501. The HD 504 stores various data such as a control program. The HDD controller 505 controls reading or writing of various data to or from the HD 504 under control of the CPU 501. The medium I/F 507 controls reading or writing of data with respect to a recording medium 506 such as a flash memory. The display 508 displays various types of information including a cursor, a menu, a window, characters, and image. The display 508 is an example of a display device. The network I/F 509 is an interface that controls data communication performed with an external device through the communication network 10. The keyboard 511 is one example of an input device provided with a plurality of keys for allowing a user to input characters, numerals, or various instructions. The mouse 512 is another example of the input device with which the user selects a specific instruction or execution, selects a target for processing, and moves a cursor displayed. The CD-RW drive 514 controls reading or writing of various types of data from or to a CD-RW 513, which is one example of a detachable storage medium.

The PC 5 is further provided with a bus line 510. The bus line 510 is an address bus or a data bus that electrically connects the elements illustrated in FIG. 5, such as the CPU 501, to each other.

Referring to FIG. 5, the sharing assistant server 6, which is implemented by the general-purpose computer, includes a CPU 601, a ROM 602, a RAM 603, a HD 604, an HDD controller 605, a medium I/F 607, a display 608, a network I/F 609, a keyboard 611, a mouse 612, a CD-RW drive 614, and a bus line 610. The sharing assistant server 6 may be provided with a recording medium 606. These elements of the sharing assistant server 6 has substantially the same configuration of the elements of the PC 5 including the CPU 501, the ROM 502, the RAM 503, the HD 504, the HDD controller 505, the medium I/F 507, the display 508, the network I/F 509, the keyboard 511, the mouse 512, the CD-RW drive 514, and the bus line 510, and the redundant description is omitted here.

Referring to FIG. 5, the schedule management server 8, which is implemented by the general-purpose computer, includes a CPU 801, a ROM 802, a RAM 803, a HD 804, an HDD 805, a medium I/F 807, a display 808, a network I/F 809, a keyboard 811, a mouse 812, a CD-RW drive 814, and a bus line 810. The schedule management server 8 may be provided with a recording medium 806. These elements of the schedule management server 8 has substantially the same configuration of the elements of the PC 5 including the CPU 501, the ROM 502, the RAM 503, the HD 504, the HDD controller 505, the medium I/F 507, the display 508, the network I/F 509, the keyboard 511, the mouse 512, the CD-RW drive 514, and the bus line 510, and the redundant description is omitted here.

Further, any one of the above-described control programs may be recorded in a file in a format installable or executable on a computer-readable recording medium, or non-transitory recording medium, for distribution. Examples of the recording medium include, but not limited to, a compact disc-recordable (CD-R), a digital versatile disc (DVD), a blue-ray disc, and a secure digital (SD) card. In addition, such recording medium may be provided in the form of a program product to users within a certain country or outside that country.

The sharing assistant server 6 may be configured by a single computer or a plurality of computers to which divided portions (functions, means, or storages) are arbitrarily assigned. This also applies to the schedule management server 8.

Software Configuration of Electronic Whiteboard

Figure 6:
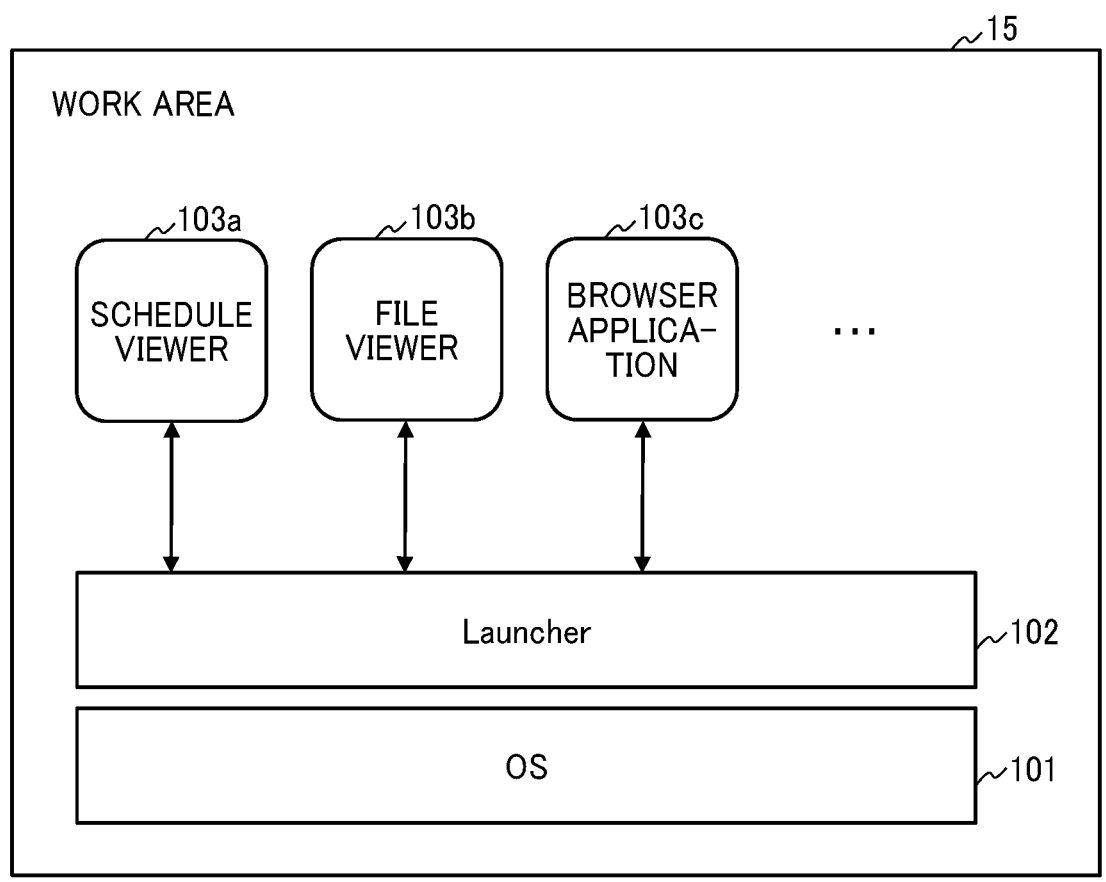
FIG. 6 is a diagram illustrating a software configuration of an electronic whiteboard, according to an embodiment of the disclosure.

FIG. 6 is a diagram illustrating a software configuration of the electronic whiteboard 2, according to the present embodiment. As illustrated in FIG. 6, an operating system (OS) 101, a Launcher 102, a schedule viewer 103a, a file viewer 103b, and a browser application 103c operate on a work area 15 of the RAM 203. The OS 101 provides a basic function of the electronic whiteboard 2 and is basic software for managing the whole electronic whiteboard 2.

The Launcher 102 is a launcher application operating on the OS 101. For example, the Launcher 102 manages the start and end of an event, such as a meeting, executed using the electronic whiteboard 2, or manages external applications such as the schedule viewer 103a, the file viewer 103b, and the browser application 103c used during the event executed.

The schedule viewer 103a, the file viewer 103b, and the browser application 103c are external applications (hereinafter referred to as "external application(s) 103" unless necessary to be distinguished from each other) operating on the Launcher 102. The external application 103 is executed independently of the Launcher 102, and implements a service or a function provided on the OS 101. In the example of FIG. 6, the three external applications, which are the schedule viewer 103a, the file viewer 103b, and the browser application 103c, are installed on the electronic whiteboard 2, however, the number of the external applications are not limited to this.

Functional Configuration

Figure 7A:
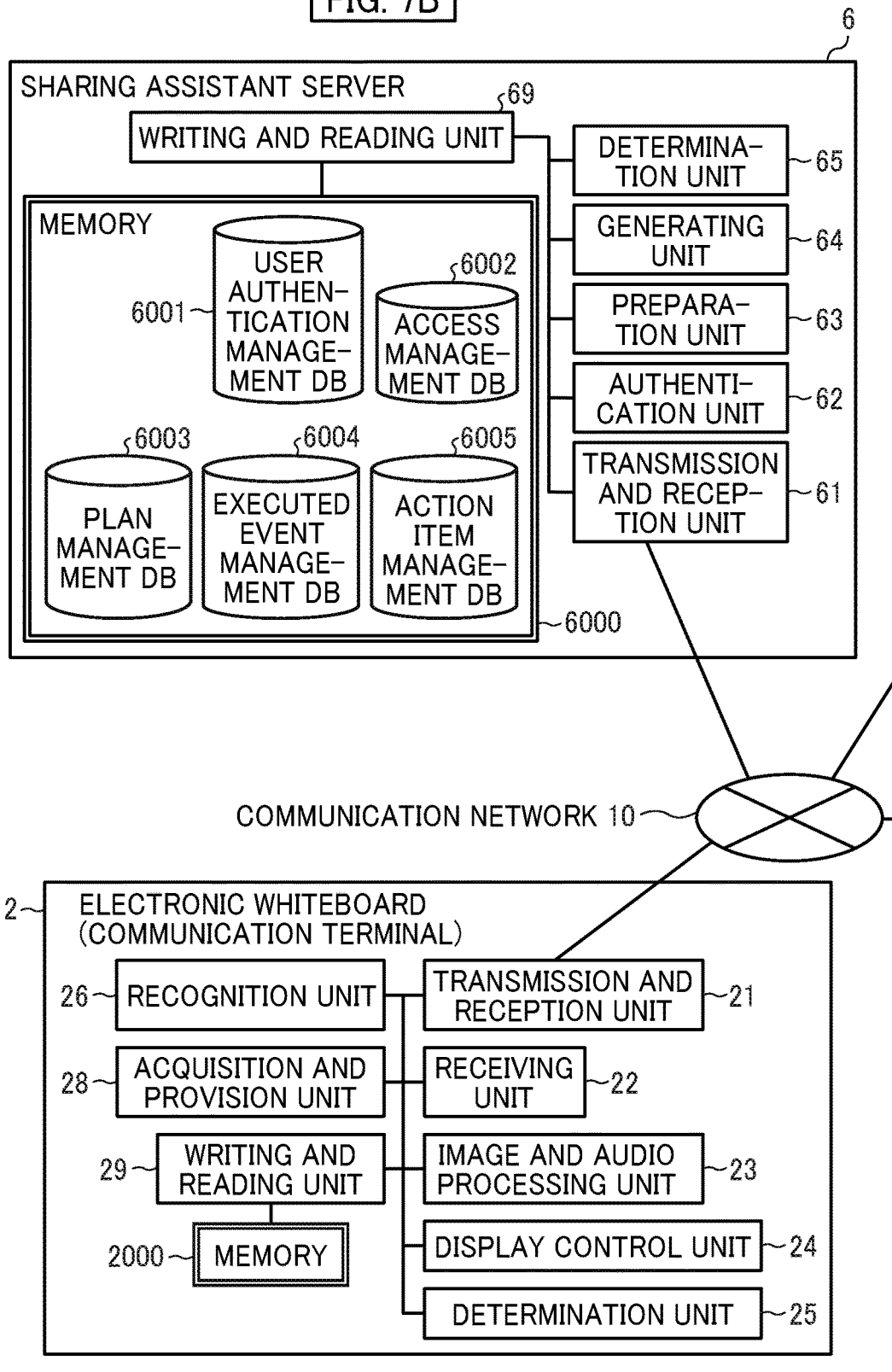
FIG. 7A and FIG. 7B (FIG. 7) are a schematic block diagram illustrating a functional configuration of a sharing system according to an embodiment of the disclosure.
Figure 7B:
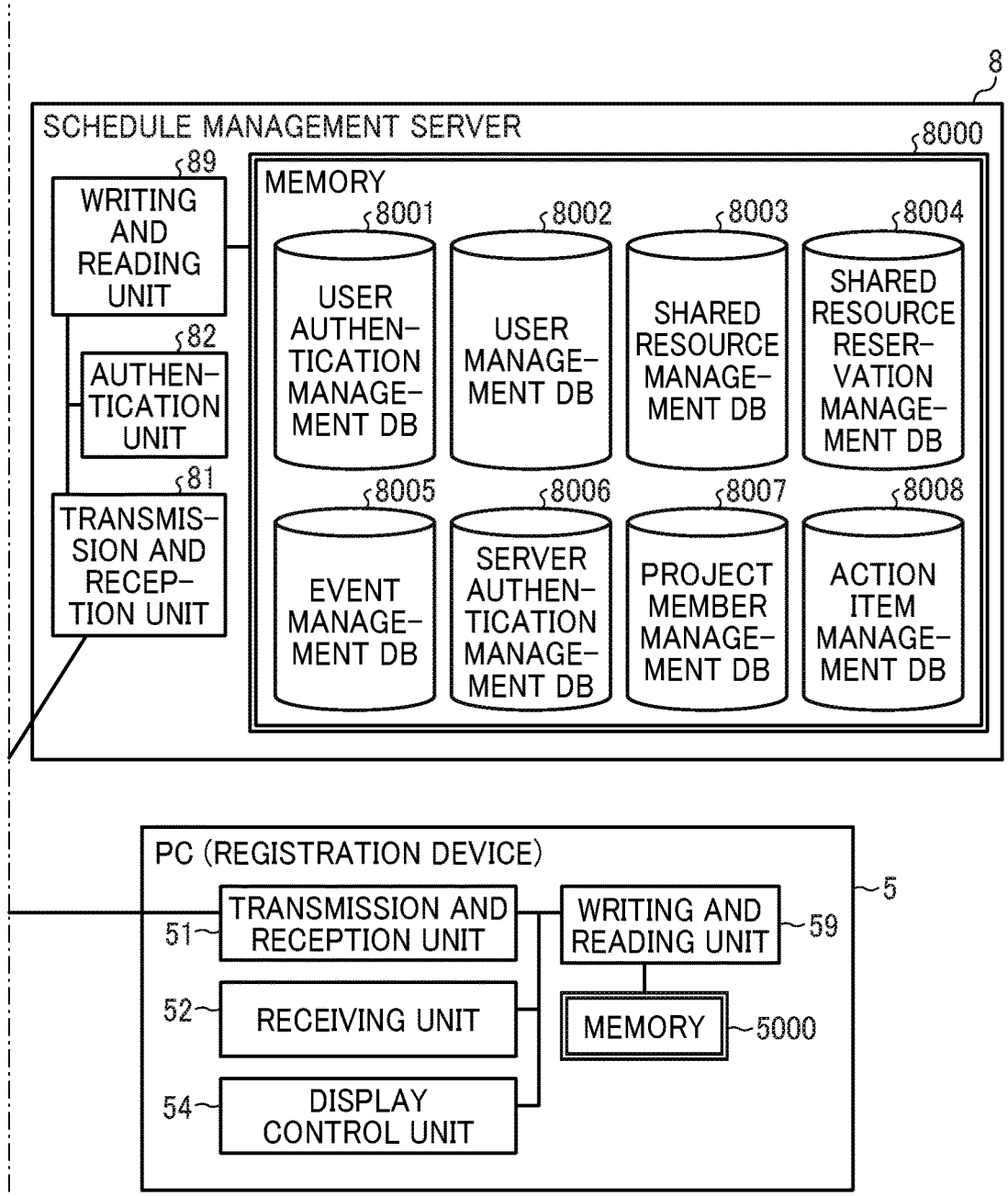

Referring to FIGS. 7 (7A and 7B) to 11, a functional configuration of the sharing system 1 according to the present embodiment is described. FIG. 7A and FIG. 7B (FIG. 7) are a schematic block diagram illustrating the functional configuration of the sharing system 1. In FIG. 7A and FIG. 7B (FIG. 7), units, or sections, of the terminals, devices, and servers, illustrated in FIG. 1 related to processes or operation described below are illustrated.

Functional Configuration of Electronic Whiteboard

As illustrated in FIG. 7A, the electronic whiteboard 2 includes a transmission and reception unit 21, a receiving unit 22, an image and audio processing unit 23, a display control unit 24, a determination unit 25, a recognition unit 26, an acquisition and provision unit 28, and writing and reading unit 29. Each of the above-mentioned units is a function that is implemented by or that is caused to function by operating any of the elements illustrated in FIG. 2 according to an instruction from the CPU 201 according to a program, which is expanded from the SSD 204 to the RAM 203. The electronic whiteboard 2 further includes a memory 2000, which is implemented by the RAM 203 and SSD 204, or the USB memory 2600 illustrated in FIG. 2.

Functional Units of Electronic Whiteboard

Each functional unit of the electronic whiteboard 2 is described below. The transmission and reception unit 21, which may be implemented by the instructions of the CPU 201, the network I/F 205, and the external device connection I/F 206, illustrated in FIG. 2, transmits or receives various types of data (or information) to or from other terminals, apparatuses, and systems through the communication network 10.

The receiving unit 22, which is implemented by the instructions of the CPU 201, the contact sensor 214, and the electronic pen controller 216, illustrated in FIG. 2, receives various inputs from the user.

The image and audio processing unit 23, which is implemented by the instructions of the CPU 201, illustrated in FIG. 2, applies image processing to image data that is obtained by capturing a subject by the camera 2400. After voice sounds generated by a user is converted to audio signals by the microphone 2200, the image and audio processing unit 23 performs processing on audio data corresponding to the audio signals. The image and audio processing unit 23 further outputs the audio signals according to the audio data to the speaker 2300, and the speaker 2300 outputs the voice sounds. The image and audio processing unit 23 also obtains drawn image data, which is drawn by the user with the electronic pen 2500 or the user's hand H onto the display 220, and converts the drawn image data to coordinate data. For example, when an electronic whiteboard (e.g., a first electronic whiteboard 2a) provided in a site transmits coordinate data to another electronic whiteboard (e.g., a second electronic whiteboard 2b) provided in another site, the second electronic whiteboard 2b causes the display 220 to display a drawn image having the same content with an image drawn with the first electronic whiteboard 2a based on the received coordinate data.

The display control unit 24, which is implemented by the instructions of the CPU 201 illustrated in FIG. 2 and the display controller 213 illustrated in FIG. 2, causes the display 220 to display a drawn image. For example, the display control unit 24 causes the display 220 to display various images rendered by an application programming interface (API) provided by the OS 101 by activating and executing the Launcher 102 and the external application 103 on the OS 101 illustrated in FIG. 6.

The determination unit 25, which is implemented by the instructions of the CPU 201 illustrated in FIG. 2, performs various types of determination.

Figure 26:
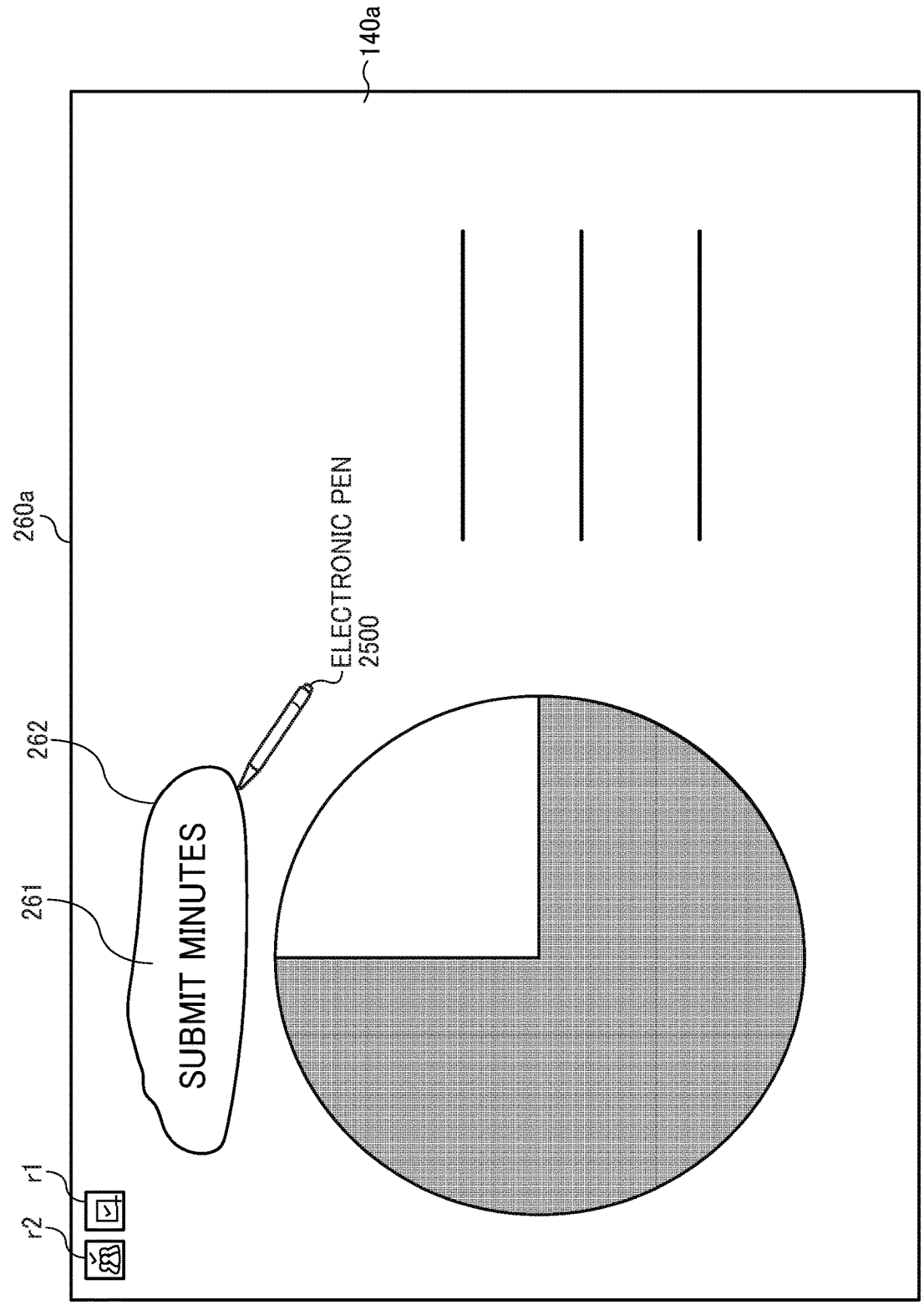
FIG. 26 is an illustration of a screen for displaying a drawing screen to recognize an action item, according to an embodiment of the disclosure.

The recognition unit 26, which is implemented by the instructions of the CPU 201 illustrated in FIG. 2, recognizes an identified area (designated area, specified area) that is made by a line 262 drawn with the electronic pen 2500 on the display 220, as illustrated in FIG. 26, which is described later.

The acquisition and provision unit 28, which is implemented by the instructions of the CPU 201 and the short-range communication circuit 219 with the antenna 219*a*, illustrated in FIG. 2, communicates with a privately-owned terminal such as an integrated circuit (IC) card or a smartphone to acquire or provide data from or to the IC card or the smartphone by short-range communication.

The writing and reading unit 29, which is implemented by the instructions of the CPU 201 and the SSD 204 illustrated in FIG. 2, stores various types of data in the memory 2000 and reads various types of data stored in the memory 2000 or the recording medium 2100. The memory 2000 overwrites the image data or the audio data each time when the image data or the audio data is received in communicating with another electronic whiteboard or videoconference terminal. The display 220 displays an image based on image data before being overwritten, and the speaker 2300 outputs audio based on audio data before being overwritten. The recording medium 2100 is implemented by a USB memory 2600 illustrated in FIG. 2.

The functions of each of the videoconference terminal 3 and the car navigation device 4 are substantially the same as those of the electronic whiteboard 2 except for the receiving unit 22, and the redundant description thereof is omitted here.

Functional Configuration of PC

The PC 5 includes a transmission and reception unit 51, a receiving unit 52, a display control unit 54, and a writing and reading unit 59. Each of the above-mentioned units is a function that is implemented by or that is caused to function by operating any of the elements illustrated in FIG. 5 according to an instruction from the CPU 501 according to a program expanded from the HD 504 to the RAM 503. The PC 5 further includes a memory 5000 implemented by the HD 504 illustrated in FIG. 5.

Functional Units of PC

Each functional unit of the PC 5 is described below. The transmission and reception unit 51, which may be implemented by the instructions from the CPU 501 and the network I/F 509 illustrated in FIG. 5, transmits or receives various types of data (or information) to or from each terminal, device, or system through the communication network 10.

The receiving unit 52, which is implemented by the instructions of the CPU 501, the keyboard 511, and the mouse 512 illustrated in FIG. 5, receives various inputs from the user.

The display control unit 54, which is implemented by the instructions of the CPU 501 illustrated in FIG. 5, controls the display 508 to display an image.

The writing and reading unit 59, which may be implemented by the instructions of the CPU 501 and the HDD controller 505, illustrated in FIG. 5, performs processing to store various types of data in the memory 5000 or read various types of data stored in the memory 2000.

Functional Configuration of Sharing Assistant Server

The sharing assistant server 6 includes a transmission and reception unit 61, an authentication unit 62, a preparation unit 63, a generating unit 64, a determination unit 65, and a writing and reading unit 69. Each of the above-mentioned units is a function that is implemented by or that is caused to function by operating any of the elements illustrated in FIG. 5 according to an instruction from the CPU 601 according to a sharing assistant program expanded from the RD 604 to the RAM 603. The sharing assistant server 6 further includes a memory 6000 implemented by, for example, the RD 604 illustrated in FIG. 5.

User Authentication Management Table

FIG. 8A is a conceptual diagram illustrating a user authentication management table, according to the present embodiment. The memory 6000 stores a user authentication management database (DB) 6001 including the authentication management table illustrated in FIG. 8A. The authentication management table stores, for each user, namely for each record, being managed, a user ID for identifying the user, a user name, an organization ID for identifying an organization to which the user belongs and a password, in association with each other. The organization ID also includes a domain name representing a group or an organization for managing a plurality of computers on the communication network.

Access Management Table

FIG. 8B is a conceptual diagram illustrating an access management table, according to the present embodiment. The memory 6000 stores an access management DB 6002 including the access management table illustrated in FIG. 8B. The access management table stores, for each access, namely for each record, being managed, an organization ID, an access ID used to authenticate the access to the schedule management server 8, and an access password, in association with each other. The access ID and the access password are required when the sharing assistant server 6 uses a service (function) provided by the schedule management server 8 via the web Application Programming Interface (API) or the like, by network communication using a Hypertext Transfer Protocol (HTTP) or a Hypertext Transfer Protocol Secure (HTTPS). The schedule management server 8 manages a plurality of schedulers which are different from each other depending on an organization, and, due to this, the schedulers are required to be managed in the access management table.

Plan Management Table

FIG. 8C is a conceptual diagram illustrating a plan management table, according to the present embodiment. The memory 6000 stores a plan management DB 6003 including the plan management table illustrated in FIG. 8C. The plan management table stores, for each planned event ID and executed event ID, namely for each record, an organization ID, a user ID for identifying a user who makes a reservation, information on the participation (i.e., the presence or absence) of the user who makes a reservation, a name of a user who makes a reservation, a scheduled start time (scheduled event start time), a scheduled end time (scheduled event end time), an event name, an user ID of a participant other than the user who makes a reservation, information on the participation (i.e., the presence or absence) of a participant other than the user who makes a reservation, and a name of a participant other than the user who makes a reservation, in association with each other. Regarding the information on participation in the plan management table, the presence is indicated by "YES", as illustrated in FIG. 8C, and the absence is indicated by "NO".

The planned event ID (event identification information) is identification information for identifying an event for which a reservation has been made. The executed event ID (event identification information) is identification information for identifying an event that is actually carried out (executed), or has been started to be executed, among the events for which the reservations have been made. The name of a user who makes a reservation is a name of a user who made a reservation for the shared resource, and for example, when the shared resource is a meeting room, the name of a user who makes a reservation is a name of a person who organizes a meeting, and when the shared resource is a vehicle, the user name of a user who makes a reservation is a name of a driver of the vehicle. The scheduled start time (scheduled event start time) indicates a scheduled time to start using the shared resource. The scheduled end time (scheduled event end time) indicates a scheduled end date and time to end using the shared resource. The event name indicates an event name of an event planned to be carried out by the user who makes a reservation. The user ID of a participant other than the user who makes a reservation is identification information for identifying a participant other than the user who makes a reservation. The name of a participant other than the user who makes a reservation is a name of the participant other than the user who makes a reservation. The name of a participant includes a name of the shared resource as well. That is, the name of a participant other than the user who makes a reservation includes the share resource in addition to the user who makes a reservation and the other participants (users).

Executed Event Management Table

Figure 21:
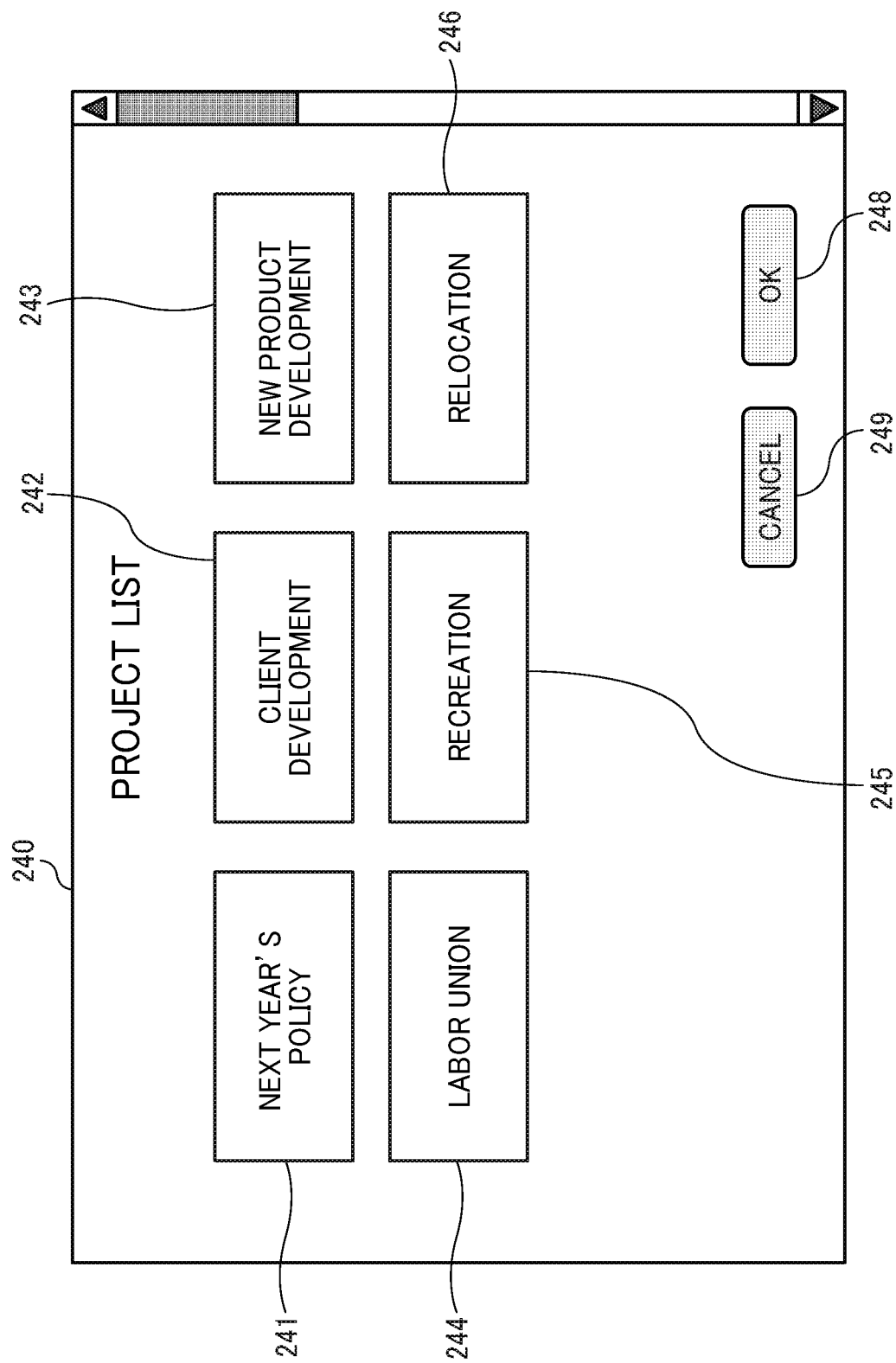
FIG. 21 is an illustration of a project list screen, according to an embodiment of the disclosure.

FIG. 9A is a conceptual diagram illustrating an executed event management table, according to the present embodiment. The memory 6000 stores an executed event management DB 6004 including the executed event management table illustrated in FIG. 9A. The executed event management table stores, for each record, a project ID and an executed event ID, in association with each other. The project ID is identification information for identifying a project. As illustrated in FIG. 21, which is described later, the project ID is assigned for each project such as "next year's policy" and "customer development".

Action Item Management Table

FIG. 9B is a conceptual diagram illustrating an action item management table, according to the present embodiment. The memory 6000 stores an action item management DB 6005 including the action item management table illustrated in FIG. 9B. An action item is generated in an event such as a meeting in a project, and content of the action item indicates an action, or a task, that is to be taken, or that is to be executed, by a person (executor) who relates to the event. The action item management table stores, for each executed event ID, an action item ID, one or more record. Each record has a user ID of an executor of the action item, a due date, and a Uniform Resource Locator (URL) of image data, in association with each other.

The action item ID is identification information for identifying an action item generated in each event. As illustrated in FIG. 31, which is described later, the action item ID is assigned for each action item such as submitting minutes ("submit minutes") and preparing a proposed document for a client ("prepare proposed document for client"). The due date indicates a deadline for completing an action, or a task, indicated by the action item. The URL of an image data indicates a storage location of the image data (saving destination of image data) indicating the action item.

Functional Configuration of Sharing Assistant Server

Each unit of the functional configuration of the sharing assistant server 6 is described in detail below. In the following description of the functional configuration of the sharing assistant server 6, the hardware elements related to each functional unit of the sharing assistant server 6, illustrated in FIG. 5, are also described.

The transmission and reception unit 61 of the sharing assistant server 6 illustrated in FIG. 7B, which is implemented by the instructions of the CPU 601 illustrated in FIG. 5 and the network I/F 609 illustrated in FIG. 5, transmits or receives various types of data (or information) to or from another terminal, device, or system through the communication network 10.

The authentication unit 62, which is implemented by the instructions of the CPU 601 illustrated in FIG. 5, determines whether information (e.g., a user ID, an organization ID, and a password) transmitted from a communication terminal is information that is previously registered in the user authentication management DB 6001 or not.

Figure 19:
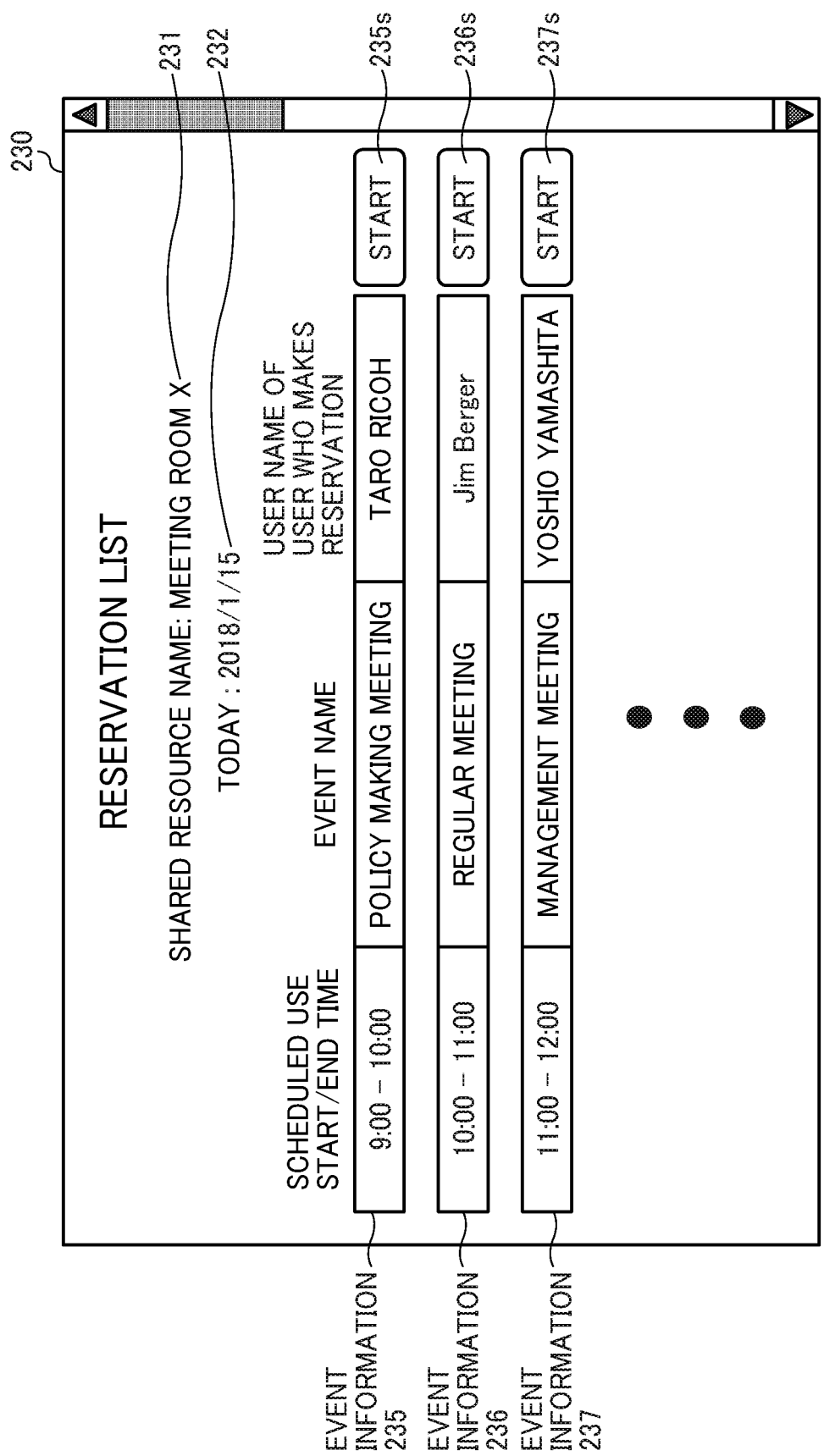
FIG. 19 is an illustration of a shared resource reservation list screen, according to an embodiment of the disclosure.

The preparation unit 63, which is implemented by the instructions of the CPU 601 illustrated in FIG. 5, prepares, or generates, a reservation list screen as illustrated in FIG. 19, which is described later, based on reservation information and plan information transmitted from the schedule management server 8.

The generating unit 64, which is implemented by the instructions of the CPU 601 illustrated in FIG. 5, generates an executed event ID, an action item ID, and a URL, which is a storage location (destination).

The determination unit 65, which is implemented by the instructions of the CPU 601 illustrated in FIG. 5, performs various types of determination. A detailed description of the determination is deferred.

The writing and reading unit 69, which may be implemented by the instructions of the CPU 601 illustrated in FIG. 5 and the HDD controller 605 illustrated in FIG. 5, performs processing to store various types of data in the memory 6000 or to read various types of data stored in the memory 6000.

Functional Configuration of Schedule Management Server

The schedule management server 8 includes a transmission and reception unit 81, an authentication unit 82, and a writing and reading unit 89. Each of the above-mentioned units is a function that is implemented by or that is caused to function by operating any of the elements illustrated in FIG. 5 according to an instruction from the CPU 801 according to a schedule management program expanded from the HD 804 to the RANI 803. The schedule management server 8 further includes a memory 8000 implemented by, for example, the HD 804 illustrated in FIG. 5.

User Authentication Management Table

FIG. 10A is a conceptual diagram illustrating a user authentication management table, according to the present embodiment. The memory 8000 stores a user authentication management DB 8001 including the user authentication management table illustrated in FIG. 10A. The user authentication management table stores, for each user ID, namely for each record, being managed, an organization ID for identifying an organization to which the user belongs and a password, in association with each other.

User Management Table

FIG. 10B is a conceptual diagram illustrating a user management table, according to the present embodiment. The memory 8000 stores a user management DB 8002 including the user management table illustrated in FIG. 10B. The user management table stores, for each organization ID being managed, one or more records. Each record includes a user ID and a user name of a user identified by the user ID, in association with each other.

Shared Resource Management Table

FIG. 10C is a conceptual diagram illustrating a shared resource management table, according to the present embodiment. The memory 8000 stores a shared resource management DB 8003 including the shared resource management table illustrated in FIG. 10C. The shared resource management table stores, for each organization ID being managed, one or more records. Each record includes a shared resource ID for identifying a shared resource and a name of the shared resource (resource name), in association with each other.

Shared Resource Reservation Management Table

FIG. 11A is a conceptual diagram illustrating a shared resource reservation management table, according to the present embodiment. The memory 8000 stores a shared resource reservation management DB 8004 including the shared resource reservation management table illustrated in FIG. 11A. The shared resource reservation management table stores, a record of reservation information in which pieces of information are associated with each other. For each record, the reservation information includes an organization ID, a shared resource ID, a shared resource name, a user ID of a user who makes reservation, a scheduled use start date and time, a scheduled use end date and time of use, and an event name. The scheduled use start date and time indicates a scheduled date and time to start using the shared resource. The scheduled use end date and time indicates a scheduled date and time to end using the shared resource. Each of the scheduled use start date and time and the scheduled use end date and time usually includes and indicates a year of time, a month of time, a day of time, an hour of time, a minute of time, a second of time and a time zone, but in FIG. 11A, a year of time, a month of time, a day of time, and an hour of time and minute of time are indicated due to the limitation of a space.

Event Management Table

FIG. 11B is a conceptual diagram illustrating an event management table, according to the present embodiment. The memory 8000 stores an event management DB 8005 including the event management table illustrated in FIG. 11B. The event management table stores plan information in which pieces of information are associated with each other for each record. The plan information includes, for each organization ID being managed, a user ID, a user name, an event start date and time, event end date and time, and an event name, which are associated with each other. The scheduled event start date and time indicates a scheduled date and time to start carrying out a corresponding event. The scheduled event end date and time indicates a scheduled date and time to end the corresponding event. Each of the scheduled use start date and time and the scheduled use end date and time usually includes and indicates a year of time, a month of time, a day of time, an hour of time, a minute of time, a second of time and a time zone, but in FIG. 11B, a year of time, a month of time, a day of time, and an hour of time and minute of time are indicated due to the limitation of a space.

Server Authentication Management Table

FIG. 12A is a conceptual diagram illustrating a server authentication management table, according to the present embodiment. The memory 8000 stores a server authentication management DB 8006 including the server authentication management table illustrated in FIG. 12A. The server authentication management table stores, for each record, an access ID and an access password in association with each other. To the access ID and the access password, the same concept as the access ID and the access password managed by the access management DB 6002 of the sharing assistant server 6 is given.

Project Member Management Table

FIG. 12B is a conceptual diagram illustrating a project member management table, according to the present embodiment. The memory 8000 stores a project member management DB 8007 including the project member management table illustrated in FIG. 12B. The project member management table stores, for each organization ID, one or more records. Each record includes a project ID, a project name, and a user ID of project member in association with each other.

Action Item Management Table

FIG. 12C is a conceptual diagram illustrating an action item management table, according to the present embodiment. The memory 8000 stores an action item management DB 8008 including the action item management table illustrated in FIG. 12C. A part of the data items managed in the action item management DB 8008 is the same as a part of the data items managed in the action item management DB 6005. The same data items in a record of the executed event ID includes, the action item ID, the user ID of the executor of the action item, and the due date.

Functional Configuration of Schedule Management Server

Each unit of the functional configuration of the schedule management server 8 is described in detail below. In the following description of the functional configuration of the schedule management server 8, the hardware elements related to each functional unit of the schedule management server 8, illustrated in FIG. 5, are also described.

The transmission and reception unit 81 of the schedule management server 8 illustrated in FIG. 7B, which is implemented by the instructions of the CPU 801 illustrated in FIG. 5 and the network I/F 809 illustrated in FIG. 5, transmits or receives various types of data (or information) to or from another terminal, device, or system through the communication network 10.

The authentication unit 82, which is implemented by the instructions of the CPU 801 illustrated in FIG. 5, determines whether information (e.g., a user ID, an organization ID, and a password) transmitted from the shared resource is information that is previously registered in the user authentication management DB 8001 or not. In addition, the authentication unit 82 performs authentication by determining whether the information (e.g., an access ID and an access password) transmitted from the sharing assistant server 6 is information that is previously registered in the server authentication management DB 8006.

The writing and reading unit 89, which is implemented by the instructions of the CPU 801 illustrated in FIG. 5 and the HDD 805 illustrated in FIG. 5, performs processing to store various types of data in the memory 8000 or read various types of data stored in the memory 8000.

Any one of the IDs described above is an example of identification information. In addition, the organization ID includes a company name, an office name, a department name, a region name, and the like. Furthermore, the user identification information includes an employee number, a driver license number, and an individual number called "My Number" under the Japanese Social Security and Tax Number System.

Operation or Process

A description is given below of processes or operation according to the present embodiment.

Process of Registering Schedule

Figure 13:
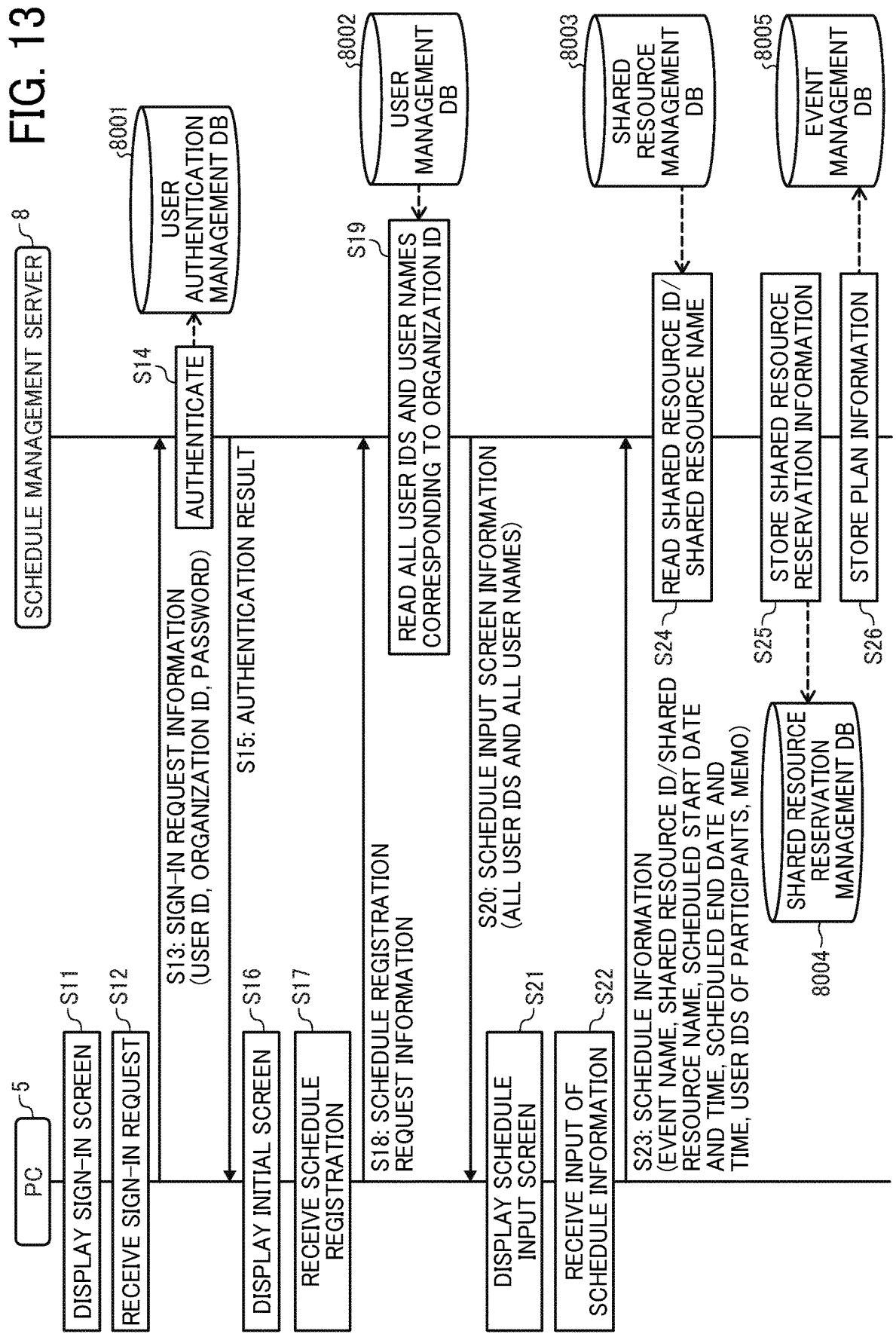
FIG. 13 is a sequence diagram illustrating a process of registering a schedule, according to an embodiment of the disclosure.
Figure 14:
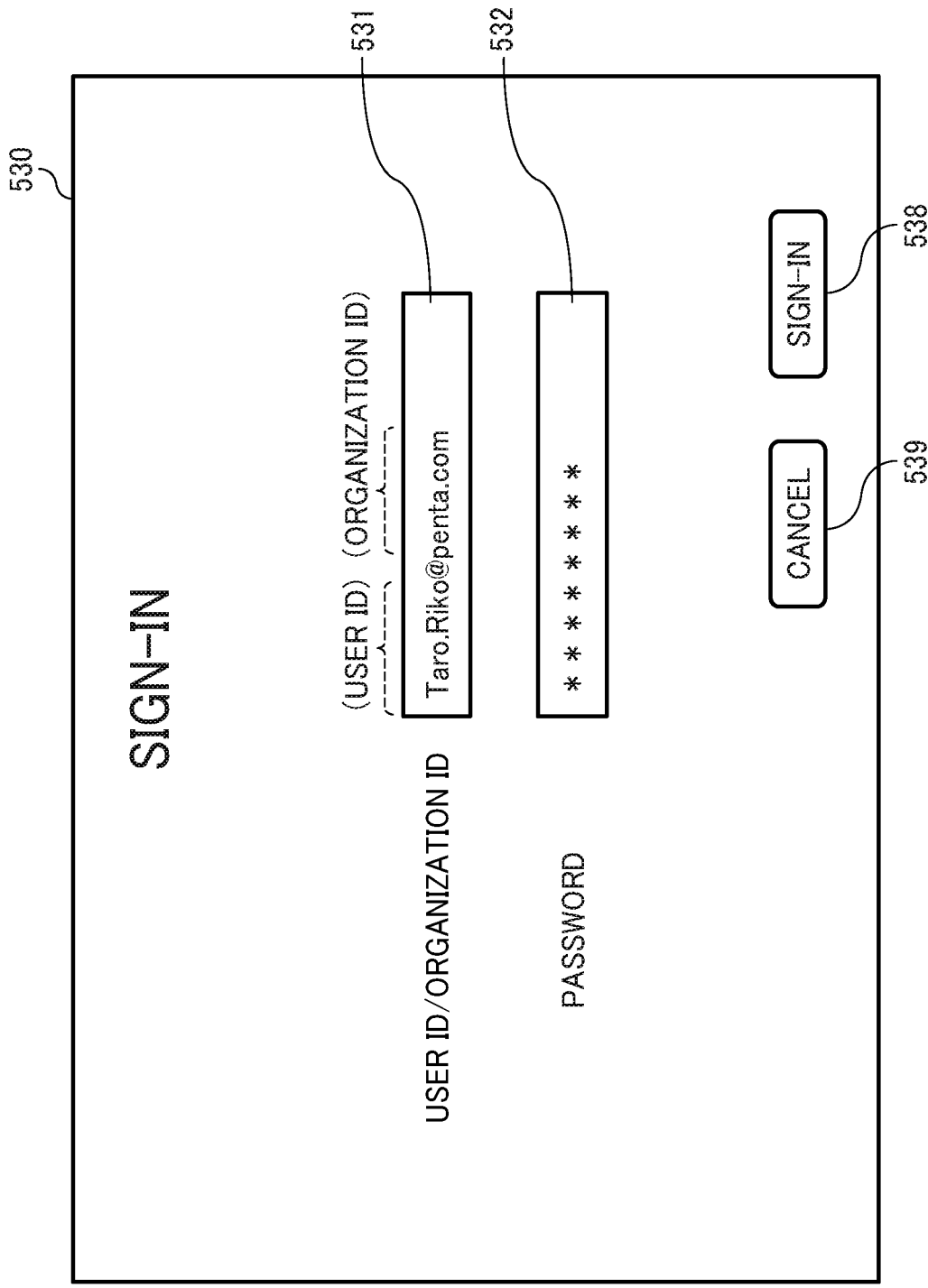
FIG. 14 is an illustration of a sign-in screen, according to an embodiment of the disclosure.

A process in which a user A (e.g., Taro Ricoh) registers a his or her schedule with the schedule management server 8 from the PC 5 is described below with reference to FIG. 13 to FIG. 16. FIG. 13 is a sequence diagram illustrating a process of registering a schedule, according to the present embodiment. FIG. 14 is an illustration of a sign-in screen, according to the present embodiment. FIG. 16 is an illustration of a screen for inputting a schedule, which is hereinafter, also referred to as a schedule input screen, according to the present embodiment.

When the user A operates, for example, the keyboard 511 of the PC 5, the display control unit 54 of the PC 5 causes the display 508 to display a sign-in screen 530, which is illustrated in FIG. 14, for sign-in (Step S11). The sign-in screen 530 has an input field 531 for inputting a user ID and organization ID of a user, an input field 532 for inputting a password, a sign-in button 538 to be pressed to sign in, and a cancel button 539 to be pressed to cancel the sign-in. In the example of the present embodiment, the user ID and the organization ID is an electronic mail (E-mail) address of the user A. A part of the e-mail address indicating a user name is the user ID, and another part of the e-mail address indicating a domain name is the organization ID. Note that the input field 531 may have a field for inputting a user ID and a field for inputting an organization ID separately, instead of inputting an e-mail address.

Subsequently, when the user A inputs his or her user ID and organization ID in the input field 531, enters his or her password in the input field 532, and presses the sign-in button 538, the receiving unit 52 receives a sign-in request for sign-in (Step S12). Subsequently, the transmission and reception unit 51 of the PC 5 transmits, to the schedule management server 8, sign-in request information indicating the sign-in request (Step S13). The sign-in request information includes the information (i.e., the user ID, the organization ID, and the password) received in S12. Accordingly, the transmission and reception unit 81 of the schedule management server 8 receives the sign-in request information.

Subsequently, the authentication unit 82 of the schedule management server 8 authenticates the user A using the user ID, the organization ID, and the password (Step S14). More specifically, the writing and reading unit 89 refers the user authentication management DB 8001 (see FIG. 10A) to search for a set of a user ID, an organization ID, and a password corresponding to the user ID, organization ID, and the password that are received in S13. When there is the corresponding set, the authentication unit 82 determines that the user A, who is a source of the request, is an authorized user. When there is no corresponding set, the authentication unit 82 determines that the user A is not an authorized (unauthorized) user. When the user A is not an authorized user, the transmission and reception unit 81 transmits, to the PC 5, a notification indicating that the user A is not an authorized user. In the following, an example in which the user A is an authorized user described.

Subsequently, the transmission and reception unit 81 transmits an authentication result to the PC 5 (Step S15). Accordingly, the transmission and reception unit 51 of the PC 5 receives the authentication result.

Figure 15:
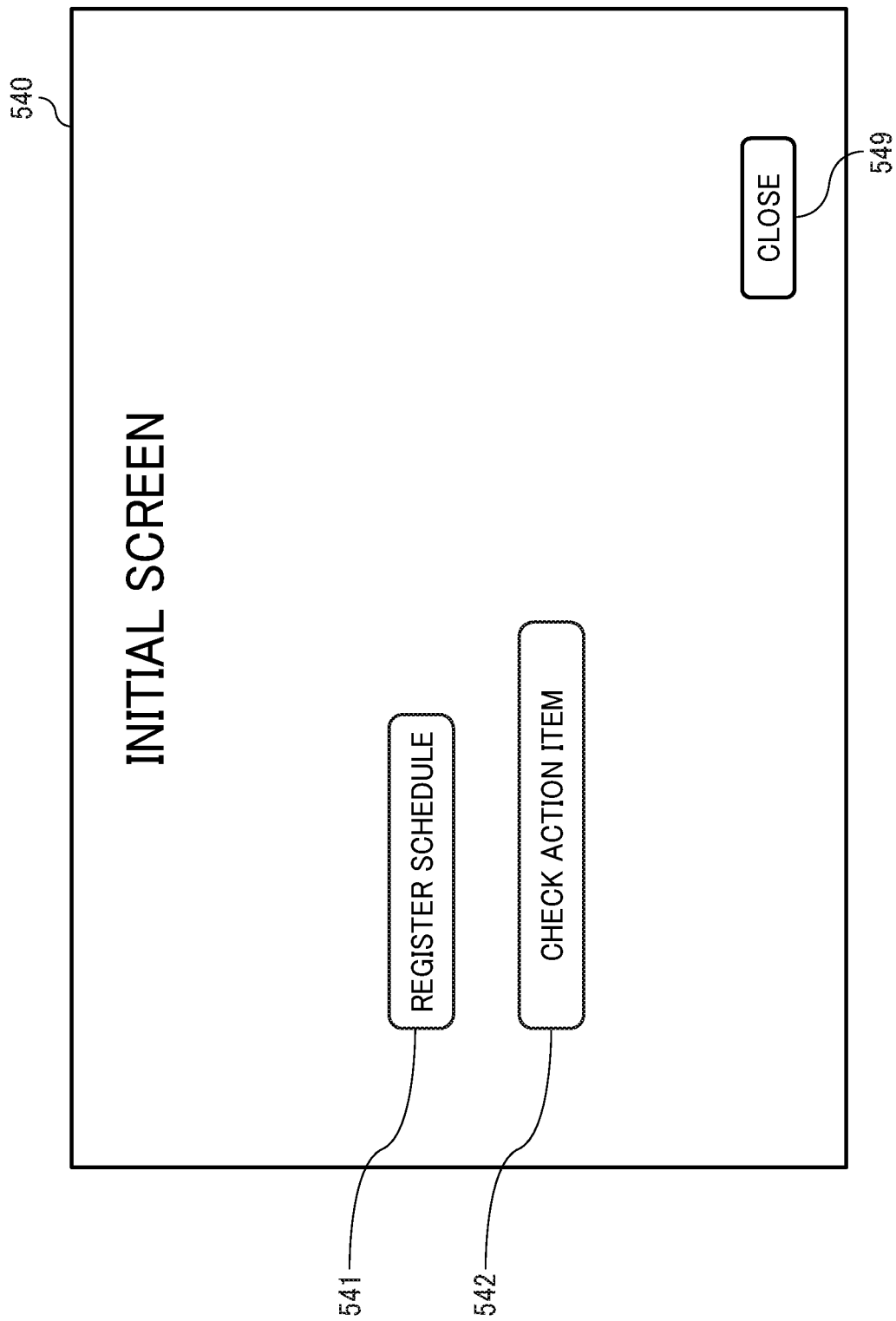
FIG. 15 is an illustration of an initial screen of a PC, according to an embodiment of the disclosure.
Figure 16:
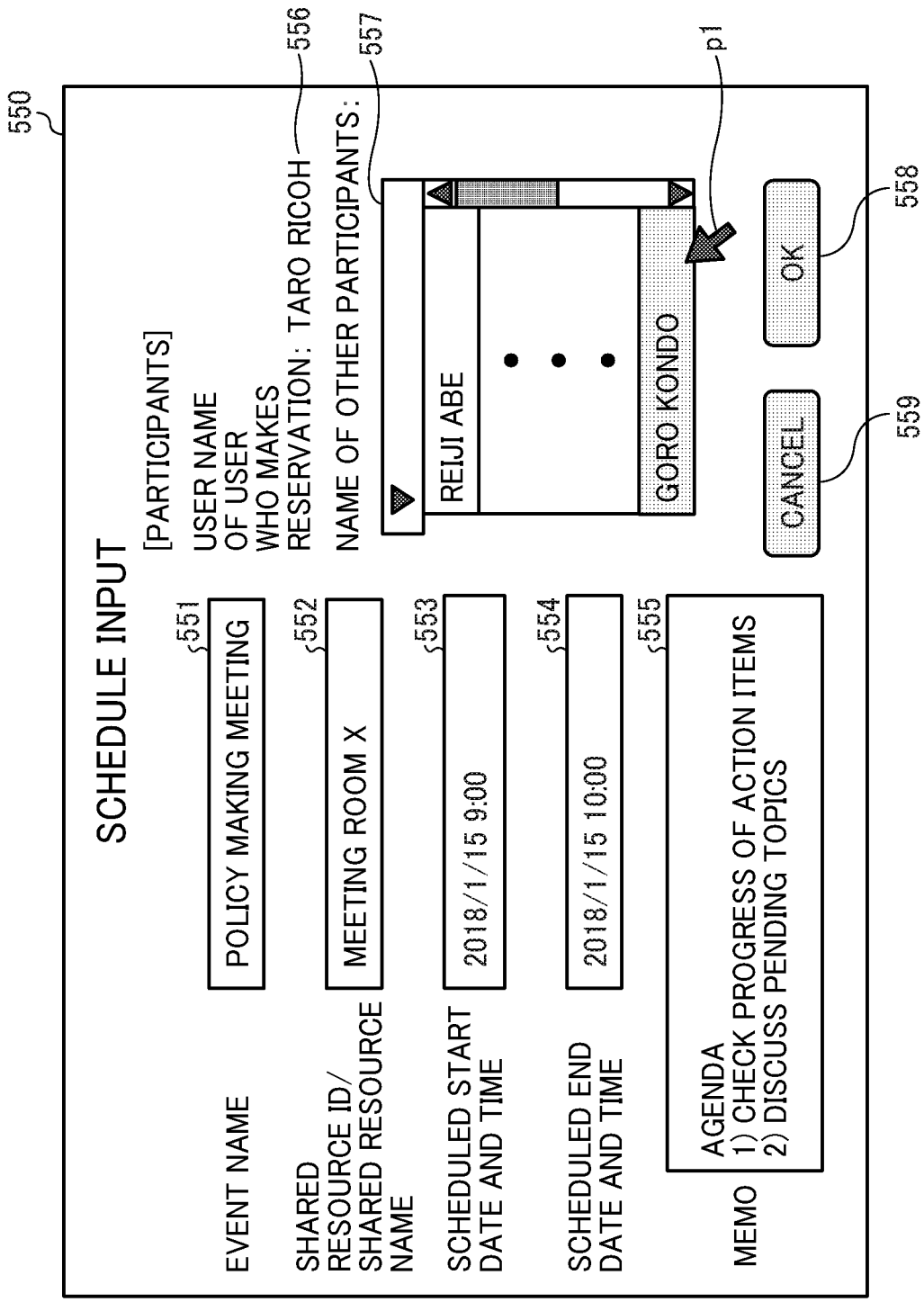
FIG. 16 is an illustration of a schedule input screen, according to an embodiment of the disclosure.

Subsequently, the display control unit 54 of the PC 5 causes the display 508 to display an initial screen 540, which is illustrated in FIG. 15 (Step S16). The initial screen 540 has a "register schedule" button 541 for registering a schedule and a "check action item" button 542 for viewing action items. When the user presses the "register schedule" button 541, the receiving unit 52 receives a schedule registration (Step S17). Subsequently, the transmission and reception unit 51 transmits a schedule registration request to the schedule management server 8 (Step S18). Accordingly, the transmission and reception unit 81 of the schedule management server 8 receives the schedule registration request.

Subsequently, the writing and reading unit 89 of the schedule management server 8 searches the user management DB 8002 (see FIG. 10B) using the organization ID received in S13 as a search key and reads all user IDs and all user names corresponding to the search key (Step S19). Then, the transmission and reception unit 81 transmits schedule input screen information to the PC 5 (Step S20). The schedule input screen information includes all user IDs and all user names that are read in S19. All user names include a user name of the user A who made a reservation and who input for the sign-in in S12. Accordingly, the transmission and reception unit 51 of the PC 5 receives the schedule input screen information.

Subsequently, the display control unit 54 of the PC 5 causes the display 508 to display a schedule input screen 550, which is illustrated in FIG. 16 (Step S21).

The schedule input screen 550 includes an input field 551 for inputting an event name, an input field 552 for inputting a shared resource ID or a shared resource name, an input field 553 for inputting a scheduled start date and time of an event (date and time for starting using a shared resource), an input field 554 for inputting a scheduled end date and time of an event (date and time for ending using a shared resource), an input field 555 for entering a memo such as an agenda, a display field 556 for displaying a name of a user who makes a reservation, a selection menu 557 for selecting participants other than the user who makes a reservation, an "OK" button 558 to be pressed to register the reservation, and a "CANCEL" button 559 to be pressed to cancel the inputs. The user name of a user who makes a reservation is the name of the user who inputs for the sign-in using the PC 5 in S12. In addition, a mouse pointer pl is also displayed.

In this example, an e-mail address may be entered in the input field 552. In addition, when a shared resource name is selected in the selection menu 557, the shared resource is also added as a participant.

Subsequently, when the user A inputs an item in each of the input fields 551 to 555, selects names of users (user names), who are participants of the meeting, from the selection menu 557 by using the pointer pl, and presses the "OK" button 558, the receiving unit 52 receives the input of schedule information (Step S22). Subsequently, the transmission and reception unit 51 transmits the schedule information to the schedule management server 8 (Step S23). The schedule information includes an event name, a shared resource ID (or a share resource name), a scheduled start date and time, a scheduled end date and time, a user ID of each participant, and a memo. When a shared resource ID is entered in the input field 552 on the schedule input screen 550, the shared resource ID is transmitted, and when a shared resource name is entered in the input field 552, the shared resource is transmitted. On the schedule input screen 550, the user name is selected in the selection menu 557, but since the user ID is also received in S20, the user ID corresponding to the user name is transmitted. Accordingly, the transmission and reception unit 81 of the schedule management server 8 receives the schedule information.

Subsequently, the writing and reading unit 89 of the schedule management server 8 searches the shared resource management DB 8003 (see FIG. 10C) using the shared resource ID (or shared resource name) received in S23 as a search key and reads a shared resource name (or a shared resource ID) corresponding to the search key (Step S24).

Subsequently, the writing and reading unit 89 stores the reservation information in the shared resource reservation management DB 8004 (see FIG. 11A) (Step S25). In this case, the writing and reading unit 89 adds one record of the reservation information to the shared resource reservation management table of the shared resource reservation management DB 8004 managed by a scheduler registered in advance. The reservation information is configured based on the schedule information received in S23 and the shared resource name (or shared resource ID) read in S24. In addition, the scheduled use start date and time in the shared resource reservation management DB 8004 corresponds to the scheduled start date and time in the schedule information. In addition, the scheduled use end date and time in the shared resource reservation management DB 8004 corresponds to the scheduled end date and time in the schedule information.

In addition, the writing and reading unit 89 stores the plan information in the event management DB 8005 (see FIG. 11B) (Step S26). In this case, the writing and reading unit 89 adds one record of plan information to the event management table in the event management DB 8005 managed by the scheduler that is previously registered. The plan information is configured based on the schedule information received in S23. In addition, the scheduled event start date and time in the event management DB 8005 corresponds to the scheduled start date and time in the schedule information. In addition, the scheduled event end date and time in the event management DB 8005 corresponds to the scheduled end date and time in the schedule information.

As described above, the user A registers his or her schedule with the schedule management server 8.

Process of Starting Event

Figure 17:
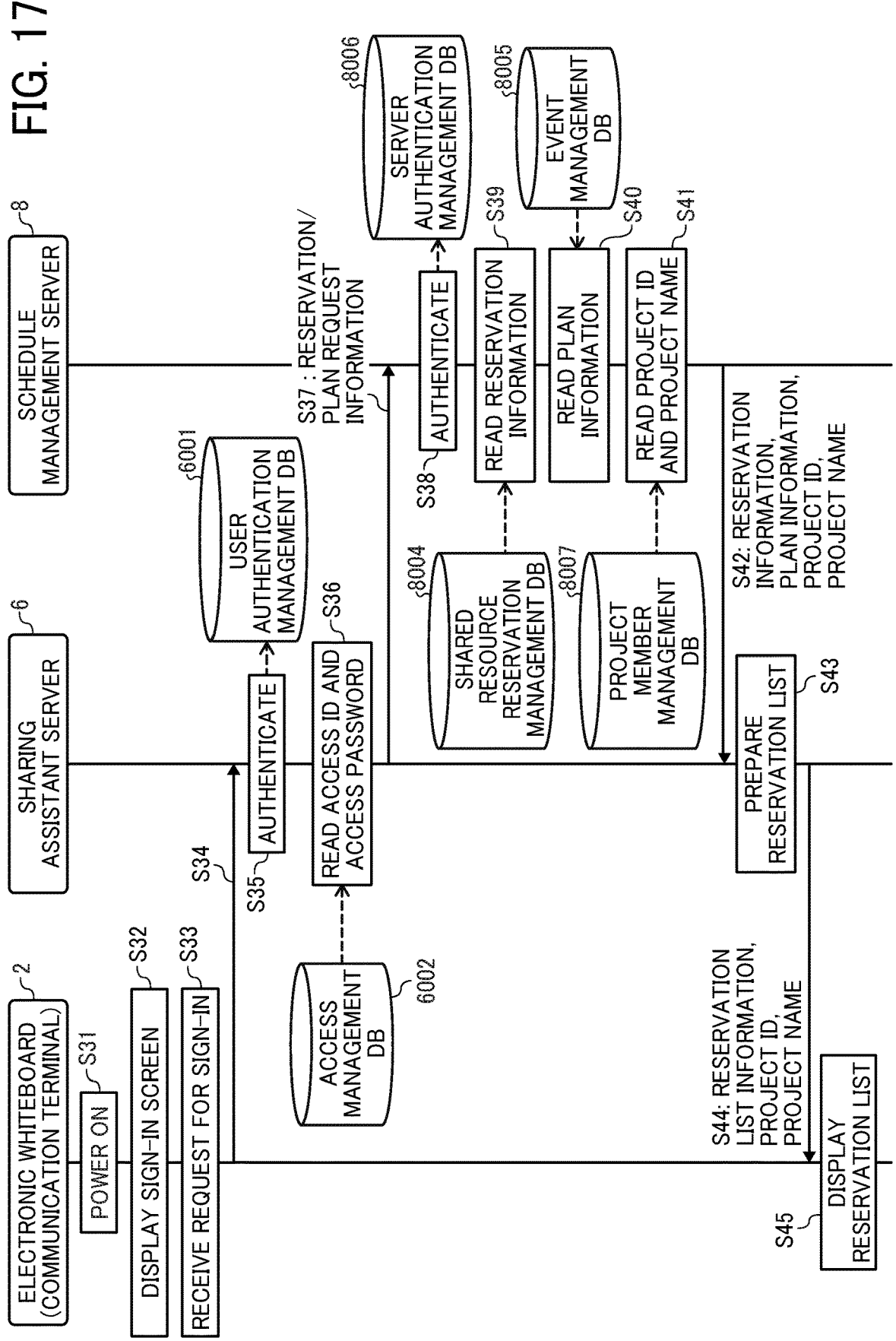
FIG. 17 is a sequence diagram illustrating a process of starting an event, according to an embodiment of the disclosure.
Figure 20:
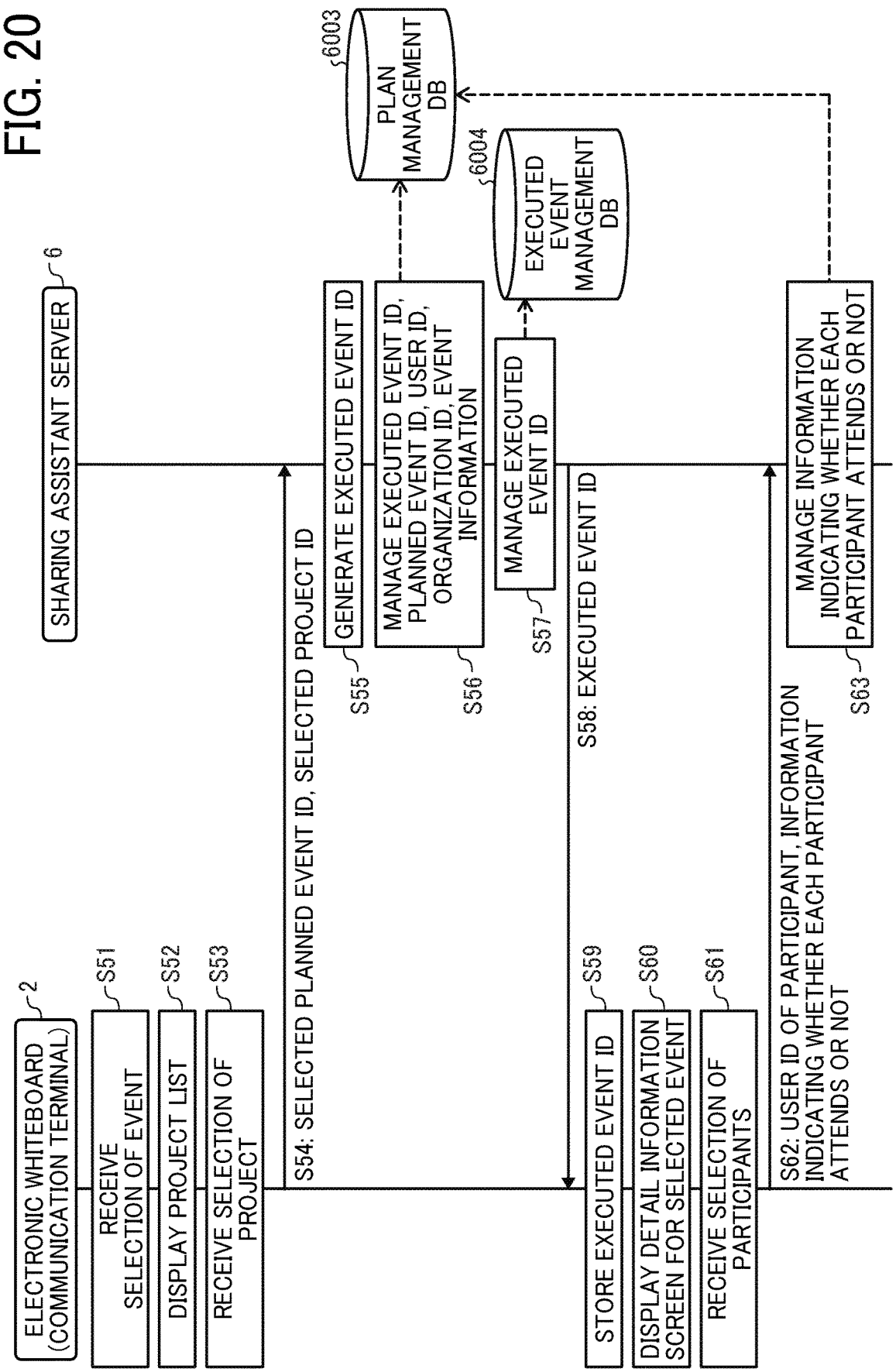
FIG. 20 is a sequence diagram illustrating a process of starting an event, according to an embodiment of the disclosure.
Figure 22:
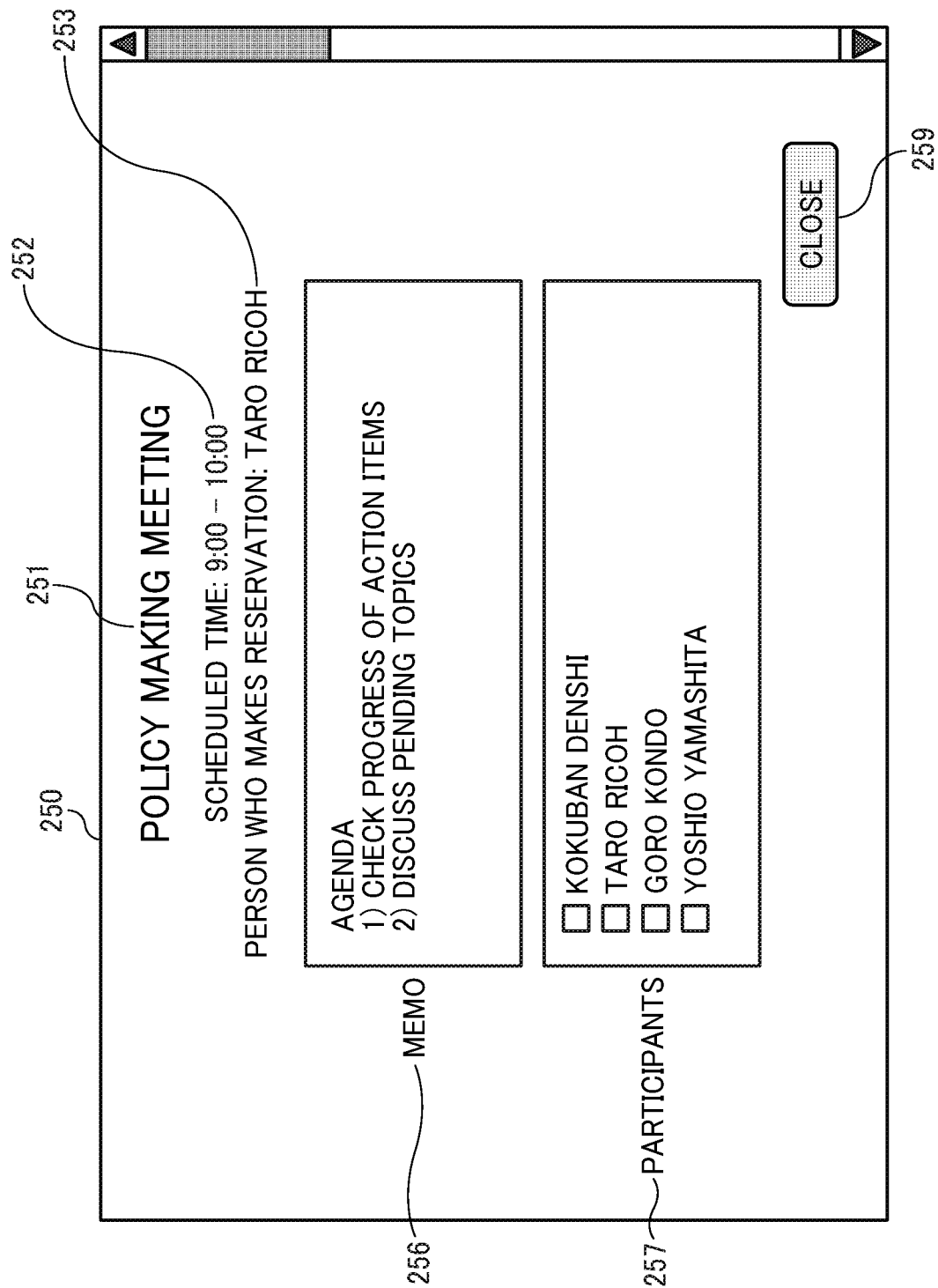
FIG. 22 is an illustration of a detail information screen for an event, according to an embodiment of the disclosure.
Figure 23:
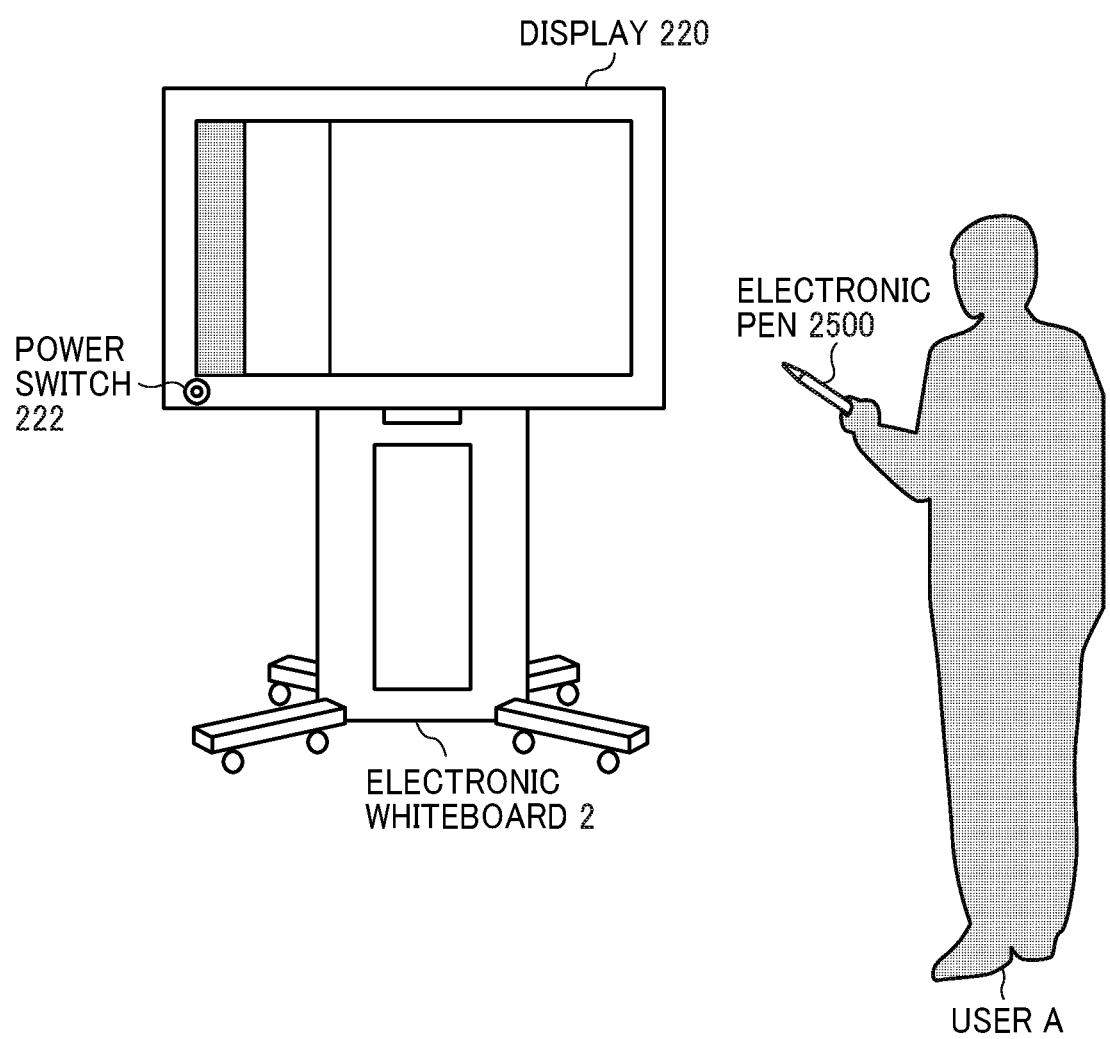
FIG. 23 is an illustration for explaining a use scenario of an electronic whiteboard, according an embodiment of the disclosure.

A process in which the user A (e.g., Taro Ricoh) organizes a meeting with other participants using the electronic whiteboard 2 in the meeting room X that is reserved by the user A in advance is described below with reference to FIG. 17 to FIG. 23. FIG. 17 and FIG. 20 are sequence diagrams each of which illustrates a process of starting an event, according to the present embodiment. FIG. 19 is an illustration of a shared resource reservation list screen, according to the present embodiment. FIG. 21 is an illustration of a project list screen, according to the present embodiment. FIG. 22 is an illustration of a detail information screen for an event, according to the present embodiment. FIG. 23 is an illustration for explaining a use scenario of the electronic whiteboard 2, according to the present embodiment.

Figure 18:
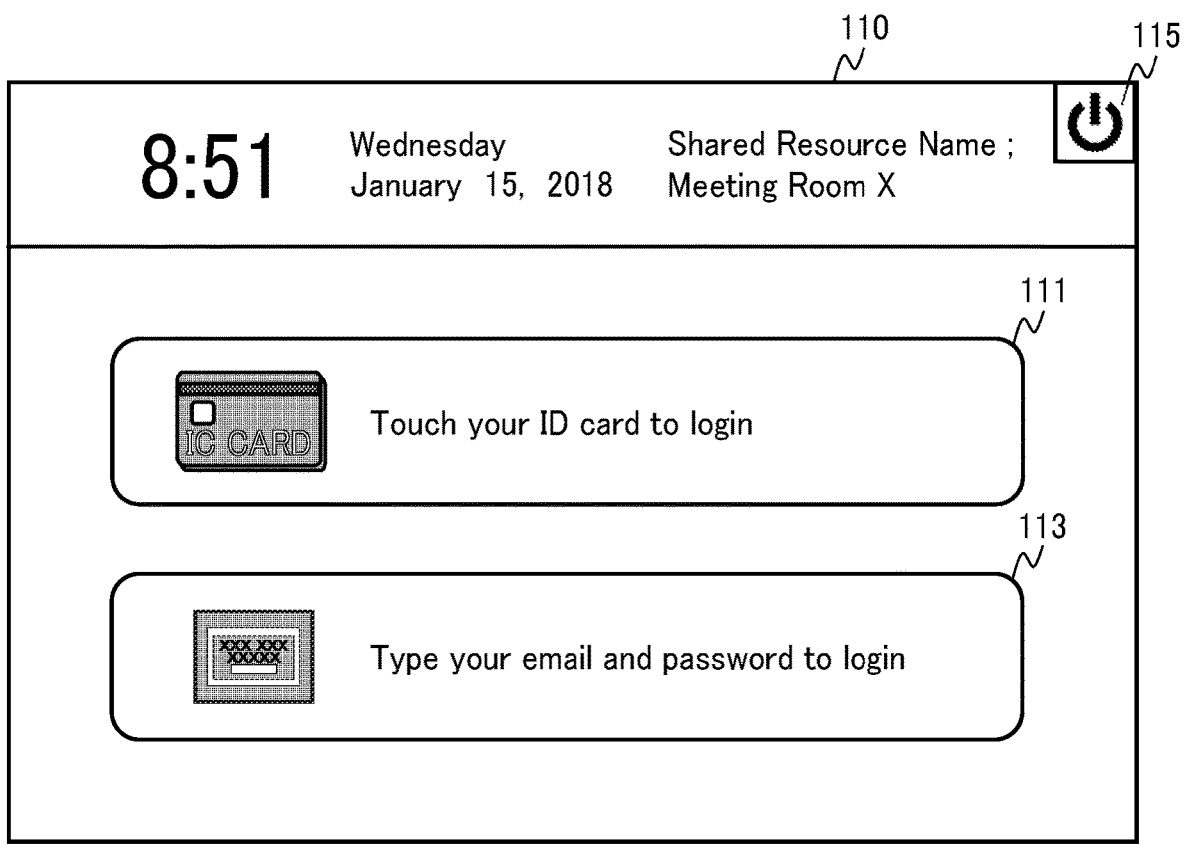
FIG. 18 is an illustration of a sign-in screen displayed on an electronic whiteboard according to an embodiment of the disclosure.

First, when the user A presses the power switch 222 of the electronic whiteboard 2, the receiving unit 22 of the electronic whiteboard 2 receives power on (Step S31). When the power ON is accepted by the receiving unit 22, the Launcher 102 illustrated in FIG. 6 is activated. Subsequently, the display control unit 24 of the electronic whiteboard 2 causes the display 220 to display a sign-in screen 110, which is illustrated in FIG. 18, for sign-in (Step S32). The sign-in screen 110 includes a select icon 111 to be pressed when the user A signs in by using his or her integrated circuit (IC) card, another select icon 113 to be pressed when the user A signs in by entering his or her electronic mail address (email) and password, and a power supply icon 115 to be pressed when the power is turned off without executing sign-in processing.

When the user A presses the select icon 111 and uses the IC card to establish a communication with the short-range communication circuit 219, such as an IC card reader, or the user A presses the select icon 113 and enters his or her electronic mail address and password, the receiving unit 22 of the electronic whiteboard 2 accepts a request for sign-in processing (S33). Hereinafter, the request for sign-in processing is also referred to as a sign-in request. Subsequently, the transmission and reception unit 21 transmits sign-in request information indicating the sign-in request to the sharing assistant server 6 (Step S34). In this example, when the user simply presses the power switch 222, the transmission and reception unit 21 automatically transmits the sign-in request information. The sign-in request information includes time zone information associated with a country or a region in which the electronic whiteboard 2 is located, a user ID, an organization ID, and a password of a user of the communication terminal (in this example, the electronic whiteboard 2). Accordingly, the transmission and reception unit 61 of the sharing assistant server 6 receives the sign-in request information.

Subsequently, the authentication unit 62 of the sharing assistant server 6 authenticates the user A using the user ID, the organization ID, and the password (S35). More specifically, the writing and reading unit 69 refers the user authentication management DB 6001 (see FIG. 8A) to search for a set of a user ID, an organization ID, and a password, using the user ID, the organization ID, and the password that are received in S35 as a search key. When there is the corresponding set, the authentication unit 62 determines that the user A, who is a source of the request, is an authorized user. When there is no corresponding set, the authentication unit 62 determines that the user A, who is a source of the request, is not an authorized (unauthorized) user. When the user A is not an authorized user, the transmission and reception unit 61 transmits, to the electronic whiteboard 2, a notification indicating that the user A is not an authorized user. In the following, an example in which the user A is an authorized user is described.

Subsequently, the writing and reading unit 69 of the sharing assistant server 6 searches the access management DB 6002 (see FIG. 8B) using the organization ID received in S34 as a search key and reads an access ID and an access password corresponding to the search key (Step S36).

Subsequently, the transmission and reception unit 61 transmits, to the schedule management server 8, reservation request information indicating information on a request for shared resource reservation information and plan request information indicating information on a request for plan information of the user (Step S37). The reservation request information and the plan request information include the time zone information and the user ID and the organization ID of a user of a communication terminal received in S34, and the access ID and the password read in S36. Accordingly, the transmission and reception unit 81 of the schedule management server 8 receives the reservation request information and the plan request information.

Subsequently, the authentication unit 82 of the schedule management server 8 authenticates the sharing assistant server 6 using the access ID and the access password (Step S38). More specifically, the writing and reading unit 89 refers the server authentication management DB 8006 (see FIG. 12A) to search for a pair of an access ID and an access password corresponding to the access ID and the access password that are received in S37. When there is the corresponding pair, the authentication unit 82 determines that the access of the sharing assistant server 6, which is a source of the request, is authorized. When there is no corresponding pair, the authentication unit 82 determines that the access of the sharing assistant server 6, which is a source of the request, is not authorized. When the access of the sharing assistant server 6 is not authorized, the transmission and reception unit 81 transmits, to the sharing assistant server 6, a notification indicating that the access is not authorized. In the following, an example in which the access is authorized is described.

Subsequently, the writing and reading unit 89 of the schedule management server 8 searches the shared resource reservation management DB 8004 (see FIG. 11A), which is managed by the scheduler specified in the above, using the user ID of a user of a communication terminal received in S35 as a search key and reads reservation information corresponding to the search key (Step S38). In this example, the writing and reading unit 89 reads the reservation information of which the scheduled use start date and time indicates today.

In addition, the writing and reading unit 89 searches the event management DB 8005 (see FIG. 11B), which is specified in the above, using the user ID of a user of a communication terminal received in S37 as a search key and reads plan information corresponding to the search key (Step S39). In this example, the writing and reading unit 89 reads the plan information of which scheduled event start date and time indicates today. When the schedule management server 8 is located in a country or a region different from the communication terminal such as the electronic whiteboard 2, the time zone is adjusted according to the country or the region where the communication terminal is installed and located, based on the time zone information.

Subsequently, the writing and reading unit 89 searches the project member management DB 8007 (see FIG. 12B) using the user ID of a user of a communication terminal received in S37 as a search key and reads all project IDs and project names corresponding to the search key, namely all project IDs and project names including the user ID of a user of a communication terminal (Step S41).

Subsequently, the transmission and reception unit 81 transmits, to the sharing assistant server 6, the reservation information read in S39, the plan information read in S40, and all project IDs and all project names read in S41 (Step S42). Accordingly, the transmission and reception unit 61 of the sharing assistant server 6 receives the reservation information, the plan information, and all project IDs and all project names.

Subsequently, the preparation unit 63 of the sharing assistant server 6 generates a reservation list based on the reservation information and the plan information received in S42 (Step S43). Subsequently, the transmission and reception unit 61 transmits reservation list information indicating content of the reservation list, all project IDs, and all project names to the electronic whiteboard 2 (Step S44). Accordingly, the transmission and reception unit 21 of the electronic whiteboard 2 receives the reservation list information, all project IDs, and all project names.

Subsequently, the display control unit 24 of the electronic whiteboard 2 causes the display 220 to display a reservation list screen 230, which is illustrated in FIG. 19 (Step S45). The reservation list screen 230 has a display area 231 for displaying a shared resource name (in this example, a name of place) and a display area 232 for displaying a date and time of today. In addition, on the reservation list screen 230, event information 235, 236, 237, etc. indicating events that utilize today's shared resource (in this example, the meeting room X) are displayed. The event information includes, for each event, a scheduled use start time to start using the shared resource and a scheduled use end time to end using the shared resource, an event name, and a user ID of a user who made a reservation. The event information includes start buttons 235s, 236s, 237s, etc., which are to be pressed to identify an event to be started by the user.

Subsequently, in FIG. 20, when the user A presses the start button 235s, which is illustrated in FIG. 19, by using, for example, the electronic pen 2500, the receiving unit 22 receives the selection of an event indicated by the event information 235 (Step S51). Then, the display control unit 24 causes the display 220 to display a project list screen 240, which is illustrated in FIG. 21, based on the project ID and the project name received in S42 (Step S52). The project list screen 240 has project icons 241 to 246 each of which indicates a project. In addition, the project list screen 240 has an "OK" button 248 to be pressed to confirm a selected project icon, and a "CANCEL" button 249 for canceling the selection of the project icon.

Subsequently, in FIG. 21, when the user A presses the project icon 241 by using, for example, the electronic pen 2500, the receiving unit 22 receives the selection of a project indicated by the project icon 241 (Step S53).

Subsequently, the transmission and reception unit 21 of the electronic whiteboard 2 transmits, to the sharing assistant server 6, the planned event ID selected in S51 and the project ID of the project selected in S53 (Step S54). Accordingly, the transmission and reception unit 61 of the sharing assistant server 6 receives the selected planned event ID and the selected project ID.

Subsequently, the generating unit 64 of the sharing assistant server 6 generates a unique executed event ID (Step S55). Then, the writing and reading unit 69 manages the executed event ID generated in S55, the planned event ID received in S54, the user ID and organization ID of the user who makes the reservation, and the event information, in association with each other (Step S56). Note that the user ID and the organization ID of the user who makes a reservation and the event information are IDs and information based on the reservation information and the plan information received in S42. At this time point, there is no entry in the field for the information on the participation (i.e., the presence or absence) of each user, namely indicating whether each user attends the meeting or not, in the plan management table (see FIG. 8C).

Subsequently, the writing and reading unit 69 manages the project ID received in S54 and the executed event ID generated in S55, in association with each other (Step S57). Then, the transmission and reception unit 61 transmits the executed event ID generated in S55 to the electronic whiteboard 2 (Step S58). Accordingly, the transmission and reception unit 21 of the electronic whiteboard 2 receives the executed event ID.

Subsequently, the writing and reading unit 29 of the electronic whiteboard 2 stores the executed event ID in the memory 2000 (Step S59). Then, the display control unit 24 causes the display 220 to display a detail information screen 250, which is illustrated in FIG. 22, including detail information on the event selected (Step S60). The detail information screen 250 for an event includes a display area 251 for displaying an event name, a display area 252 for displaying a scheduled date and time to carry out an event (scheduled event start time and scheduled event end time), and a display area 253 for displaying a name of a user who made a reservation. In addition, the detail information screen 250 for an event displays a display area 256 for displaying content of the memo and a display area 257 for displaying the prospective participant names. In the display area 257, the names of the user who makes a reservation and the other participants, which are indicated in FIG. 16, are displayed, and also check boxes for each user to confirm whether each user actually attends the meeting are displayed. The detail information screen 250 for an event also has, in a lower right part, a "close" button 259 for closing the detail information screen 250.

Subsequently, when the user inputs a check in a check box of a user who actually participates in the event, and presses the "close" button 259, the receiving unit 22 receives the selection of the participation (Step S61). Then, the transmission and reception unit 21 transmits the user ID of each user who is a prospective participant and information on the participation (i.e., the presence or absence) of each user, namely indicating whether each user attend the meeting or not, to the sharing assistant server 6 (Step S62). Accordingly, the transmission and reception unit 61 of the sharing assistant server 6 receives the user name of each who is a prospective participant and information on the participation (i.e., the presence or absence) of each user, namely indicating whether each user attend the meeting or not.

Subsequently, in the sharing assistant server 6, information on the participation (i.e., the presence or absence) of each user, namely indicating whether each user attends the meeting or not, is stored in the plan management DB 6003, namely managed by inputting the information in the corresponding fields, in which inputs have not been made yet. (Step S63).

As described above, the user A starts the event (in this example, the policy decision meeting) using the share resource (in this example, the meeting room X) and the communication terminal (in this example, the electronic whiteboard 2). As illustrated in FIG. 23, the user A can hold the meeting using the electronic whiteboard 2 in the meeting room X.

Figure 24:
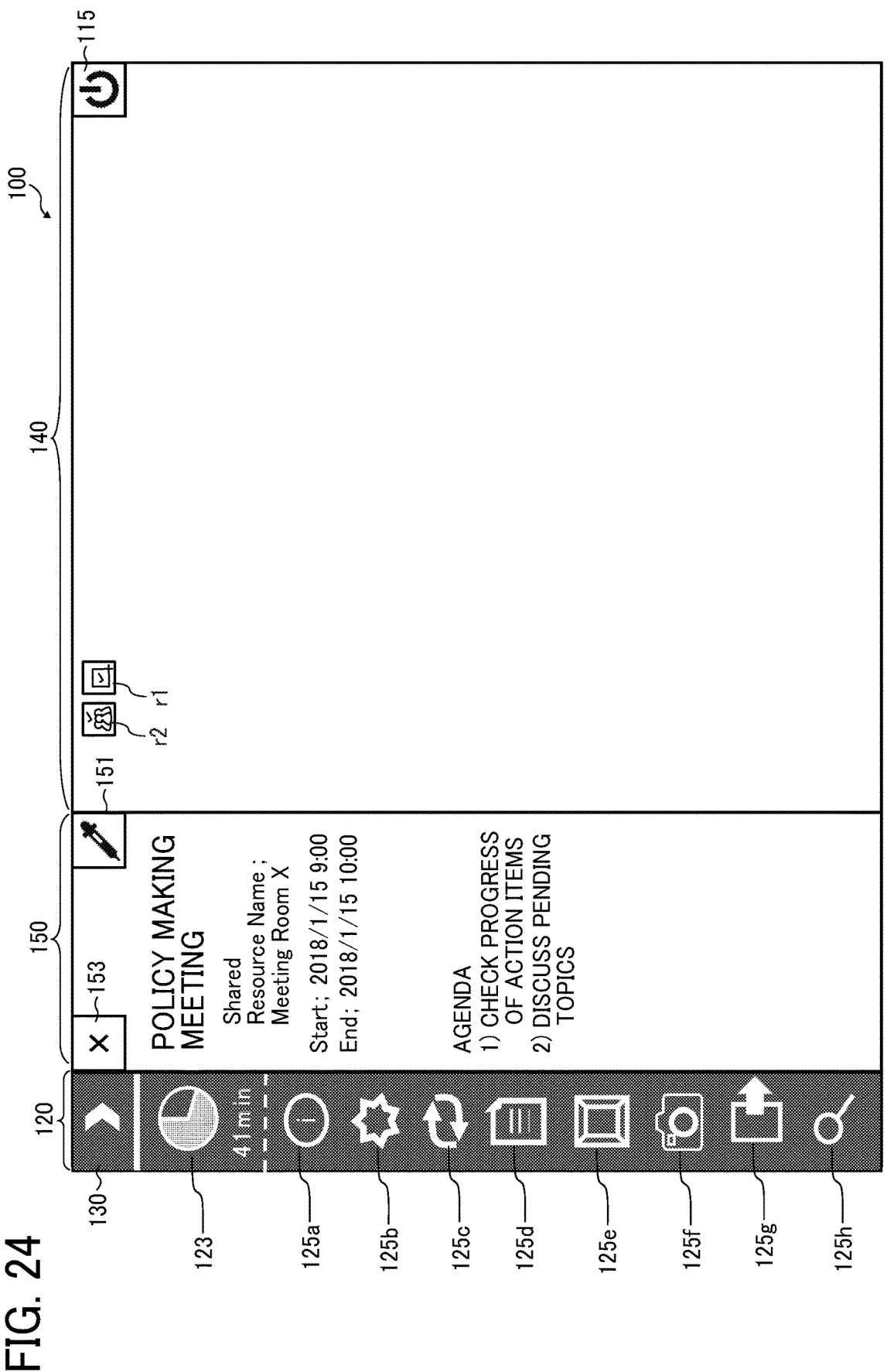
FIG. 24 is an illustration of a screen displayed on a display of an electronic whiteboard according to an embodiment of the disclosure.

A description is now given of a screen displayed on the display 220 of the electronic whiteboard 2, with reference to FIG. 24. FIG. 24 is an illustration of a screen 100 displayed on the display 220 of the electronic whiteboard 2, according to the present embodiment.

As illustrated in FIG. 24, the display screen 100 displayed on the display 220 is divided into areas including a menu display area 120, an event detail display area 150, and a drawing area 140, which is also to be a drawing screen 140a, in an order from a left side. The menu display area 120 is an example of an operation display screen (window) of the Launcher 102.

The menu display area 120 includes a display position change icon 130 that is pressed when a display position of the menu display area 120 on the display screen 100 is changed, time information 123 indicating one of an elapsed time from a start of the event and remaining time from the current time to an end of the event, and a plurality of operation icons 125 (125a to 125h) selected (pressed) when corresponding processing is performed during the event being executed.

The operation icon 125a is selected (pressed) in order to view detailed information of the event being executed. The operation icon 125b is selected (pressed) when each of the various external applications 103 is activated. The operation icon 125c is selected (pressed) when the display of an application display screen of the external application 103 being activated is switched. The operation icon 125d is selected (pressed) when file data stored in a specific storage area of the memory 2000 is browsed. The operation icon 125e is selected (pressed) when a screen size of the application display screen of the external application 103 is changed. The operation icon 125f is selected (pressed) when the display screen 100 displayed on the display 220 is captured. The operation icon 125g is selected (pressed) when the event being executed is terminated. The operation icon 125h is selected (pressed) when the browser application 103c for performing a browser search is activated.

In addition, the event detail display area 150 includes detailed information on the event input on the schedule input screen illustrated in FIG. 16.

Further, on the drawing screen 140a, an image or the like drawn by the user with the electronic pen 2500 is displayed. The drawing screen 140a includes the power supply icon 115 to be pressed when the power of the electronic whiteboard 2 is tuned off in the upper right of the screen. Furthermore, the drawing area 140 includes an icon r1 to be pressed when an action item is registered and an icon r2 to be pressed for checking an action item in the upper left of the screen.

The various icons included in the display screen 100 displayed on the electronic whiteboard 2 is an example of a "reception area". The reception area may be not only an image such as an icon or a button but also characters (letters) such as "change", or a combination of the image and the characters. The image here may be not only a symbol or a figure, but also an image that can be visually recognized by a user such as an illustration or a pattern. In addition, selecting (pressing) of various icons is an example of operations in relation to each of the various icons. Examples of the operations in relation to each of the various icons include inputting onto the display 220 using the electronic pen 2500, a double clicking or single clicking with a mouse, which is an example of the input device of a PC 2700, and inputting using a keyboard, which is an example of the input device of the PC 2700.

Process of Registering Action Item

Figure 25:
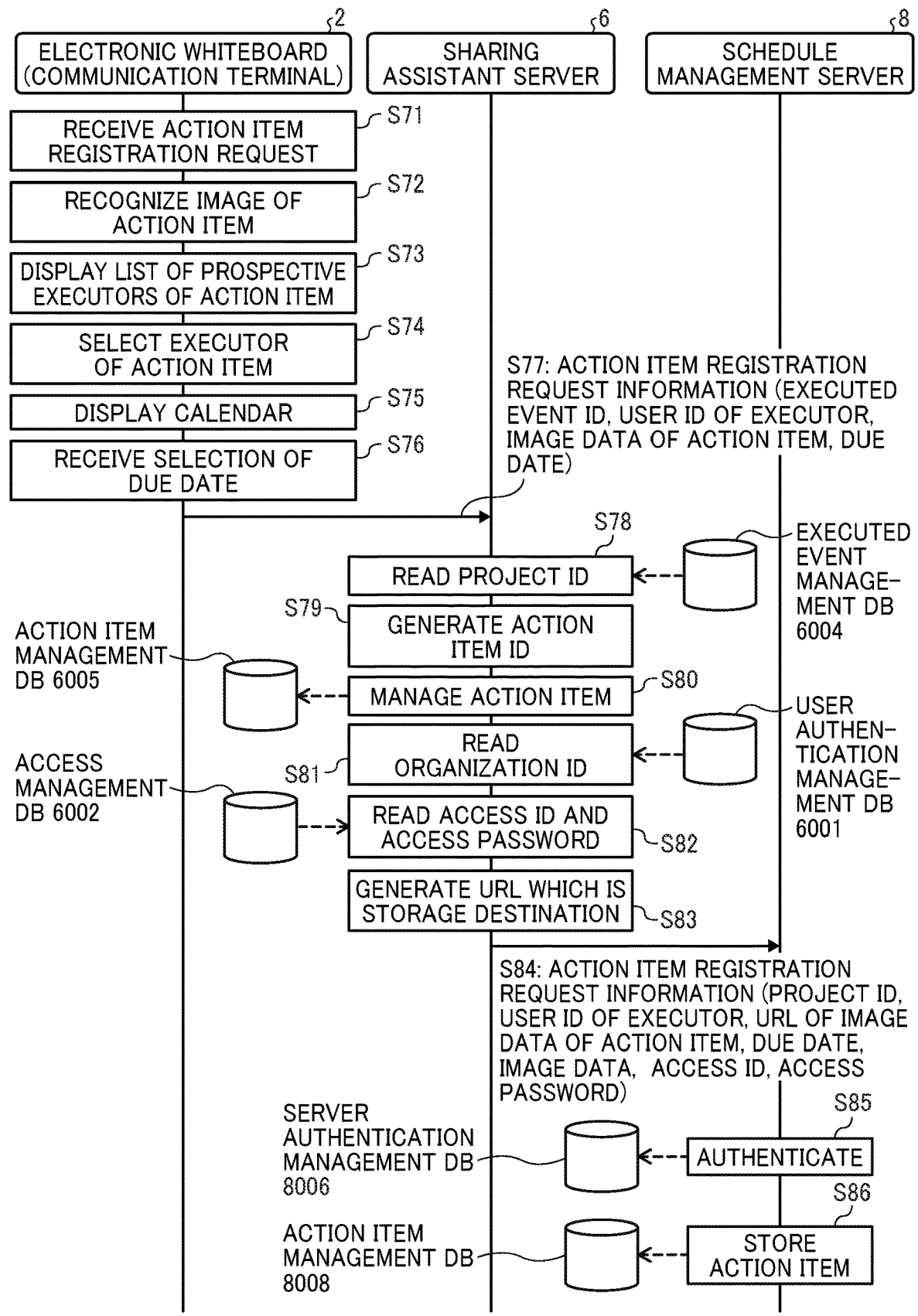
FIG. 25 is a sequence diagram illustrating a process of registering an action item, according to an embodiment of the disclosure.
Figure 27:
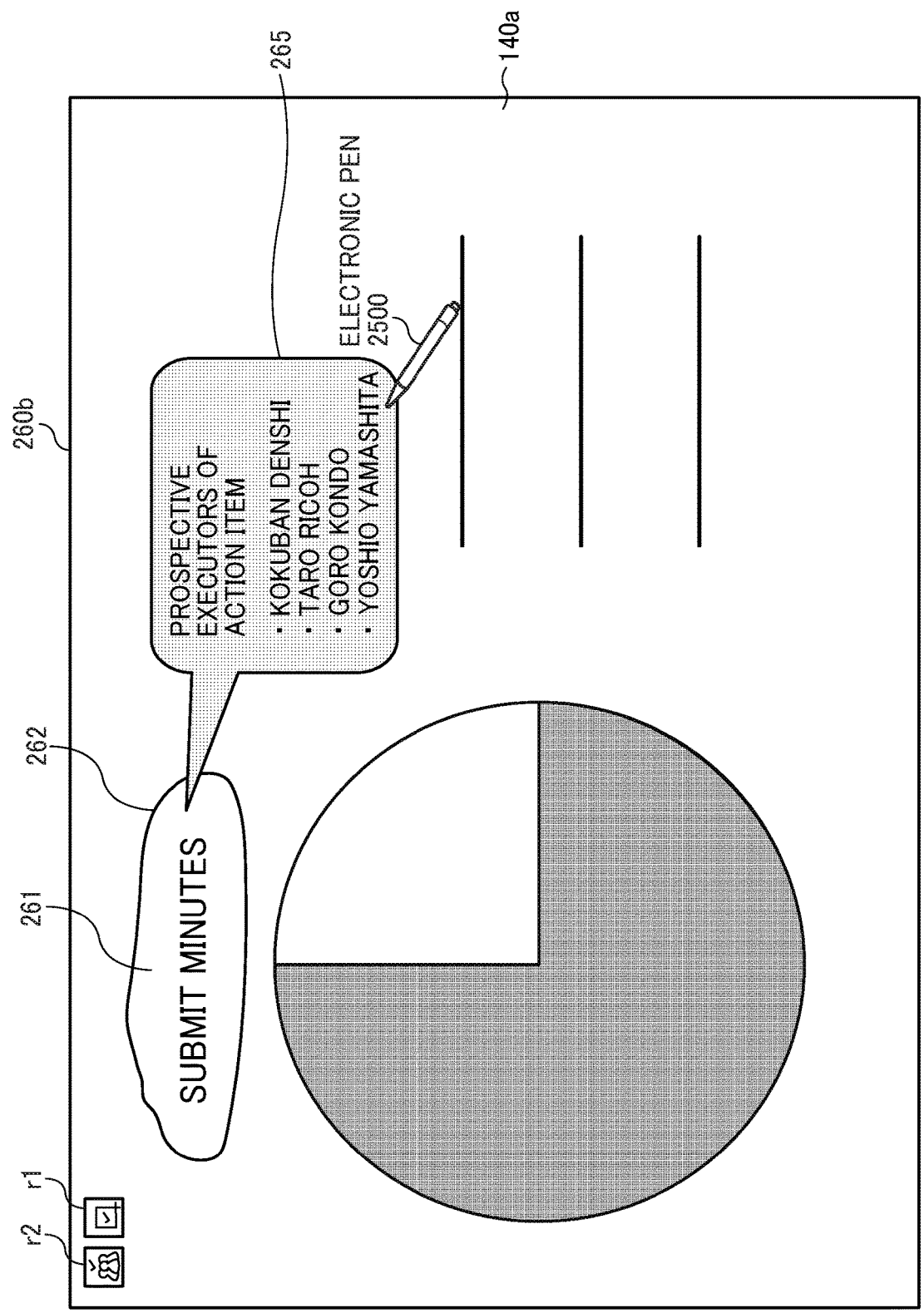
FIG. 27 is an illustration of a drawing screen for displaying a list of prospective executors of an action item, according to an embodiment of the disclosure.
Figure 28:
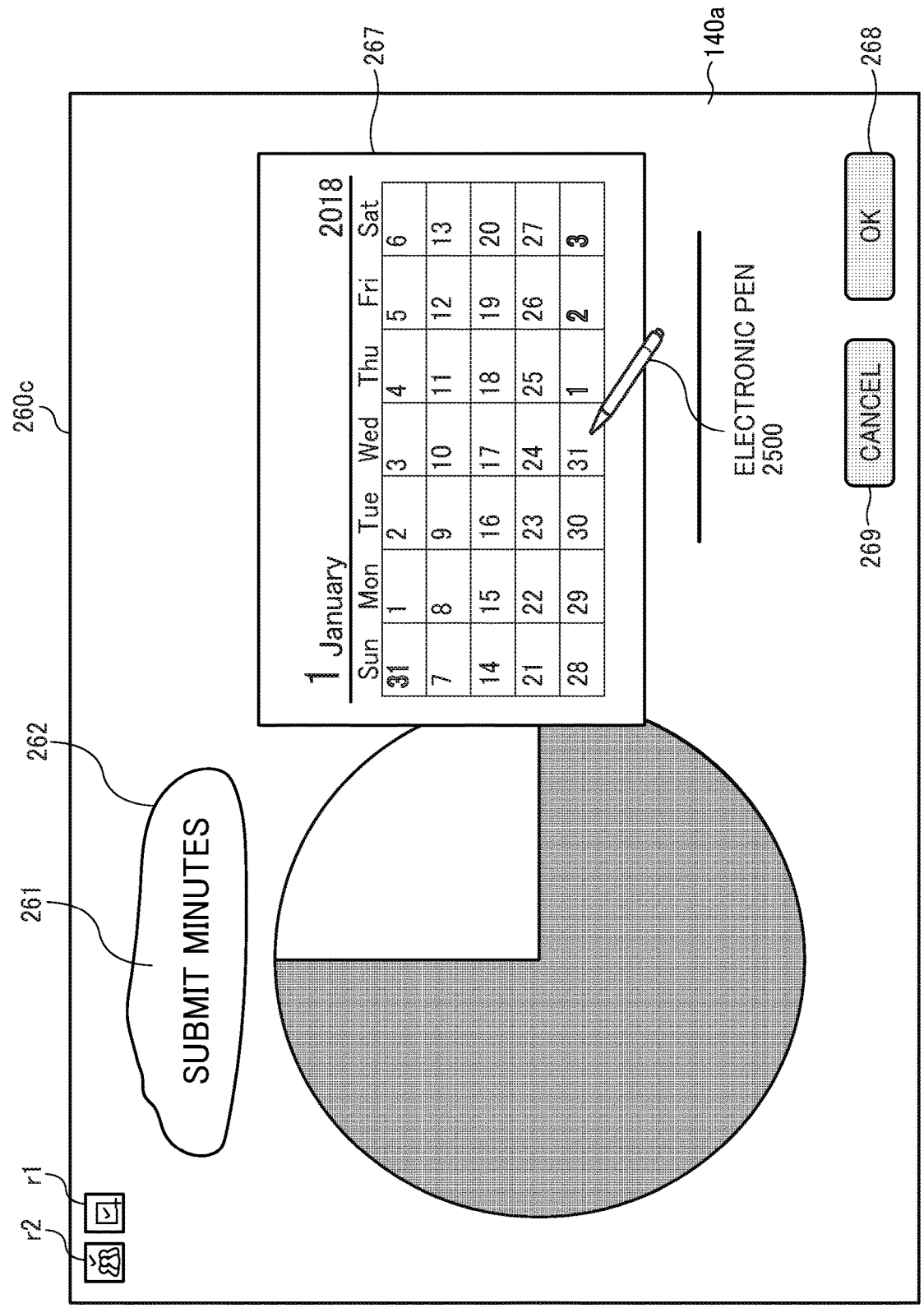
FIG. 28 is an illustration of a screen for displaying a drawing screen indicating a calendar for setting a due date of an action item.

A process of registering an action item is described below with reference to FIG. 25 to FIG. 28. FIG. 25 is a sequence diagram illustrating a process of registering an action item, according to the present embodiment. FIG. 26 is an illustration of a screen for displaying a drawing screen to recognize an action item, according to the present embodiment. FIG. 27 is an illustration of a screen for displaying a drawing screen including an action item confirmation screen, according to the present embodiment. FIG. 28 is an illustration of a screen for displaying a drawing screen indicating a calendar for setting a due date of an action item. Note that each illustration of FIG. 26 to FIG. 28 indicates the drawing area 140 among the three areas illustrated in FIG. 24.

First, in FIG. 24, when the user draws or displays material images, etc., on the drawing screen 140a and then presses the icon r1, the receiving unit 22 accepts a request for registering an action item (Step S71). Subsequently, as illustrated in FIG. 26, when the user uses the electronic pen 2500 to draw an action item (in this example, "submit minutes") on a drawing screen 260a of the electronic whiteboard 2 and then to circle, or enclose with the line 262 to generate the identified area, an image (drawn image) 261 that is content of the action item, the receiving unit 22 receives information on the identified area including the image 261, and the recognition unit 26 recognizes the image 261 included in the identified area (Step S72).

Subsequently, as illustrated in FIG. 27, the display control unit 24 displays a prospective executor list 265 indicating a list of prospective executors of the action item on a drawing screen 260b (Step S73). Subsequently, when the user selects an executor of the action item by using the electronic pen 2500, the receiving unit 22 receives the selection of the executor of the action item (Step S74).

Subsequently, as illustrated in FIG. 28, the display control unit 24 displays a calendar 267 for receiving a due date of execution of the action item on a drawing screen 260c (Step S75). Subsequently, when the user selects the due date by using the electronic pen 2500, the receiving unit 22 receives the selection of the due date (Step S76). The calendar 267 is an example of a due date setting screen. The due date setting screen may be a date list or the like in which days of the week etc. are not described.

Subsequently, the transmission and reception unit 21 transmits action item registration request information indicating the action item registration request to the sharing assistant server 6 (Step S77). The action item registration request information includes the executed event ID indicating an event in which the action item is generated, the user ID of the executor of the action item selected in S74, the image data of the action item recognized in S72 (in this example, the image data of "submit minutes") and the due date of the action item received in S76. That is, the transmission and reception unit 21 transmits the image data in the predetermined area as image data indicating the content of the action item, which is generated in the executed event. Accordingly, the transmission and reception unit 61 of the sharing assistant server 6 receives the action item registration request information.

Subsequently, the writing and reading unit 69 of the sharing assistant server 6 searches the executed event management DB 6004 using the executed event ID received in S77 as a search key and reads a project ID corresponding to the search key (Step S78).

Subsequently, the generating unit 64 generates an action item event ID unique to the action item for identifying the action item (Step S79). Then, the writing and reading unit 69 manages, in the action item management DB 6005, for each executed event ID received in S77, the user ID of the executor of the action item, the due date, and the action item ID received in S79, in association with each other (Step S80).

Subsequently, the writing and reading unit 69 searches the user authentication management DB 6001 using the user ID of an executor of the action item as a search key and reads an organization ID corresponding to the search key (Step S81).

Subsequently, the writing and reading unit 69 searches the access management DB 6002 using the organization ID read in S81 as a search key and reads an access ID and an access password corresponding to the search key (Step S82). Subsequently, the generating unit 64 generates a URL, which is a storage destination (location) of the image data indicating the content of the action item (Step S83). In this example, the URL of the generated URL of the image data is stored in the action item management DB 6005 by the writing and reading unit 69.

Subsequently, the transmission and reception unit 61 transmits action item registration request information indicating an action item registration request to the schedule management server 8 (Step S84). The action item registration request information includes the project ID read in S78, the user ID of an executor of the action item received in S77, the URL of the image data of the action item generated in S83, and the due date and the image data of the action item received in S77, and an access ID and an access password read in S82. Accordingly, the transmission and reception unit 81 of the schedule management server 8 receives the action item registration request information.

Subsequently, the authentication unit 82 of the schedule management server 8 authenticates the sharing assistant server 6 using the access ID and the access password (Step S85). Since the authentication processing is substantially the same as the processing of S36 described above, a redundant description thereof is omitted. The following describes an example in which a result of the authentication includes the information indicating that the sharing assistant server 6 is authorized.

The writing and reading unit 89 stores, in the action item management DB 8008, each type of data (information) received in S84 (Step S86). As a result, the schedule management server 8 manages data same as that of the sharing assistant server 6.

Process of Checking Action Item

Figure 29:
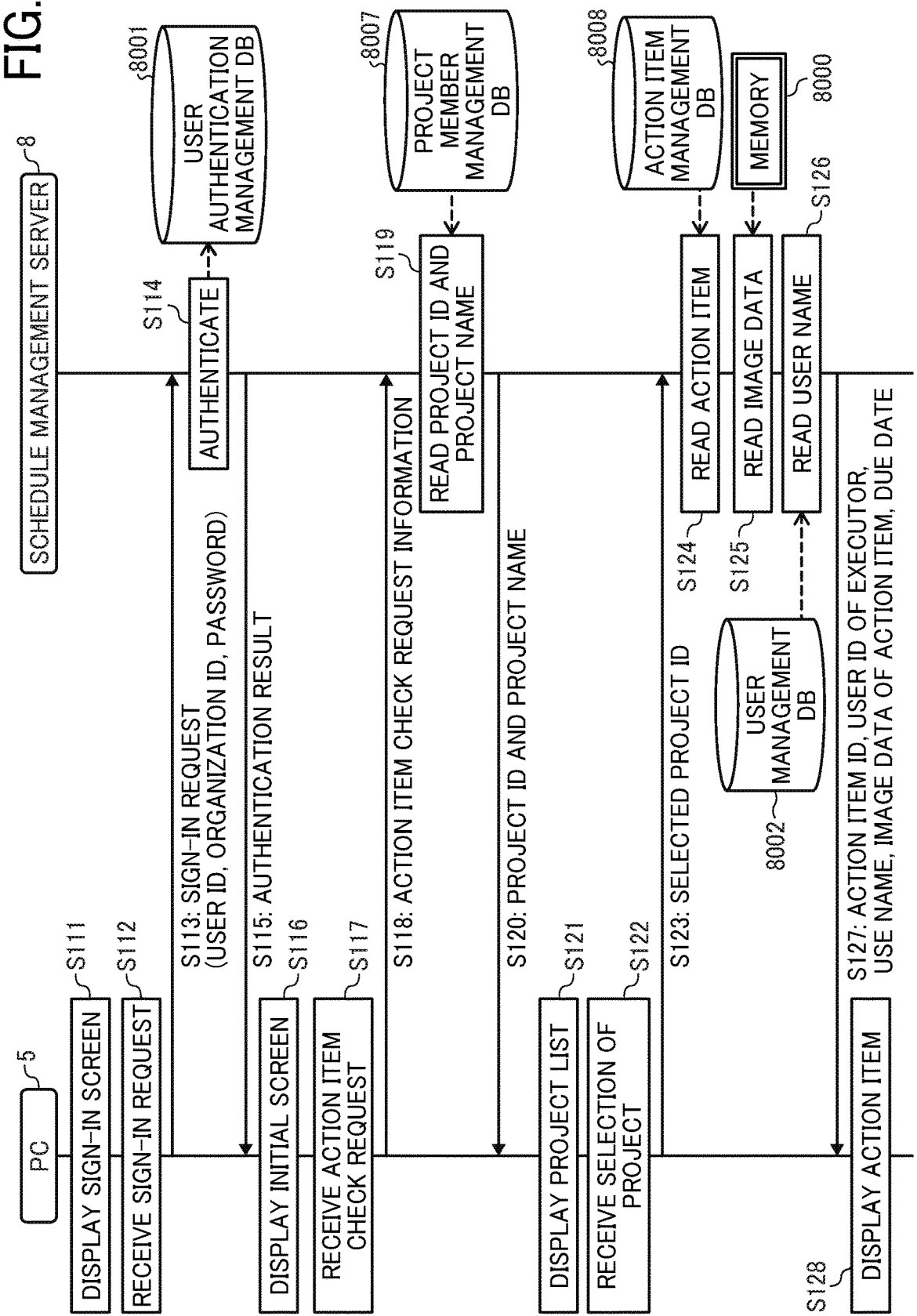
FIG. 29 is a sequence diagram illustrating a process of checking an action item, according to an embodiment of the disclosure.
Figure 30:
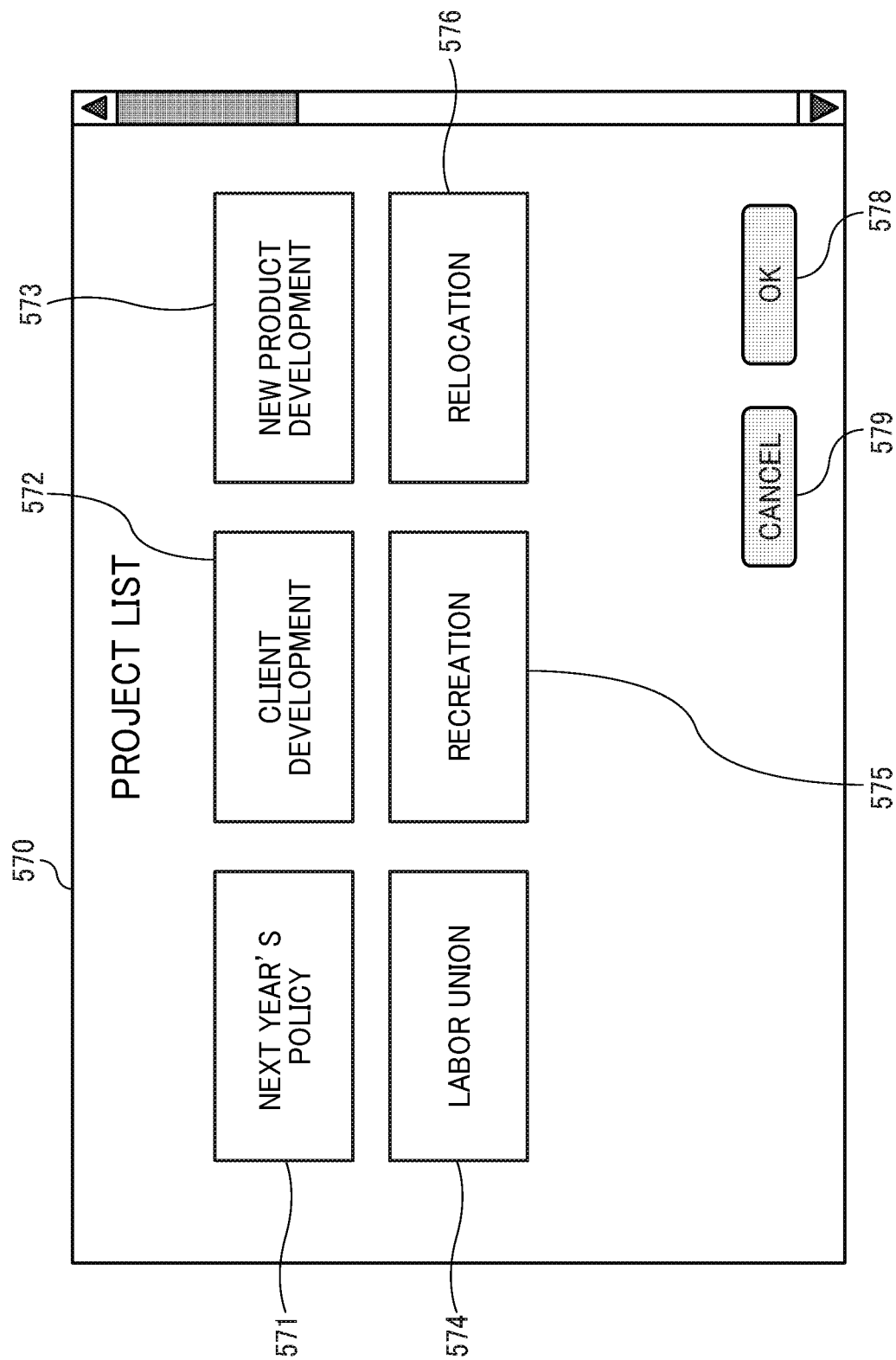
FIG. 30 is an illustration of a project list screen displayed using a PC, according to an embodiment of the disclosure.

A process of checking an action item is described below with reference to FIG. 29 to FIG. 31. FIG. 29 is a sequence diagram illustrating a process of checking, or looking, an action item, according to the present embodiment. FIG. 30 is an illustration of a project list screen displayed with the PC 5, according to the present embodiment. FIG. 31 is an illustration of an action item screen displayed with the PC 5, according to the present embodiment. Since processing of S111 to S116 in FIG. 29 is substantially the same as the processing of S11 to S16 in FIG. 13, a redundant description thereof is omitted.

Subsequently, on the initial screen 540 illustrated in FIG. 15, when the user presses the "check action item" button 542, the receiving unit 52 receives a request to check, or look, an action item (action item check request) (Step S117).

Then, the transmission and reception unit 51 transmits action item check request information indicating the action item check request to the schedule management server 8 (Step S118). Accordingly, the transmission and reception unit 81 of the schedule management server 8 receives the action item check request information.

Subsequently, the writing and reading unit 89 of the schedule management server 8 searches the project member management DB 8007 using the user ID and organization ID received in S113 as a search key and reads a project ID and a project name corresponding to the search key (Step S119). Then, the transmission and reception unit 81 transmits the project ID and the project name to the PC 5 (Step S120).

Subsequently, the display control unit 54 of the PC 5 causes the display 508 to display a project list screen 570, which is illustrated in FIG. 30 (Step S121). The project list screen 570 displays similar or the same content as the project list screen 240 of FIG. 21 displayed on the electronic whiteboard 2. That is, project icons 571 to 576 and buttons 578 and 579 in FIG. 30 correspond to the project icons 241 to 246 and the buttons 248 and 249 in FIG. 21, respectively.

Subsequently, in FIG. 30, when the user A presses the project icon 571 by using, for example, the mouse 512, the receiving unit 52 receives the selection of a project indicated by the project icon 571 (Step S122).

Subsequently, the transmission and reception unit 51 of the PC 5 transmits the project ID and the project name selected in S122 to the schedule management server 8 (Step S123). Accordingly, the transmission and reception unit 81 of the schedule management server 8 receives the project ID.

Subsequently, the writing and reading unit 89 of the schedule management server 8 searches the action item management DB 8008 using the project ID received in S123 as a search key and reads information on an action item corresponding to the search key (Step S124). The information on an action item includes an action item ID, a user ID of an executor of the action item, a due date, and a storage location of image data indicating content of the action item. Subsequently, the writing and reading unit 89 reads image data indicating content of the action item from the storage location of the image data indicating content of the action item (Step S125). In addition, the writing and reading unit 89 searches the user management DB 8002 using the user ID of an executor of the action item read in S124 as a search key and reads a user name corresponding to the search key (Step S126). Subsequently, the transmission and reception unit 81 transmits, to the PC 5, the action item ID, the user ID of the executor of the action item, and the due date, which are read in S124, the image data read in S125, and the user name read in S126 (Step S127). Accordingly, the transmission and reception unit 51 of the PC 5 receives the user ID and the user name of the executor of the action item, the image data of the action item, and the due date.

Then, the display control unit 54 of the PC 5 causes the display 508 to display an action item screen 580, which is illustrated in FIG. 31, based on the data (information) received in S127 (Step S128). As illustrated in FIG. 31, the action item screen 580 includes pieces of action item information 581 to 584. For example, the action item information 581 includes an image indicating the content of the action item identified in FIG. 26, the user name selected in FIG. 27, and the due date set in FIG. 28. The action item screen 580 also has, in a lower right part, a "close" button 589 for closing the action item screen 580.

As described above, the user can look and check the action items that are generated in a plurality of events of the same project.

With reference to FIG. 29, the example in which the action item is checked by the PC 5 is described above. In the substantially same manner, the action items can be checked or looked with the electronic whiteboard 2 when the user presses the icon r2 illustrated in FIG. 24.

Variations

A description is now given of a case in which a confirmation screen to start identifying an action item is displayed, with reference to FIG. 32. FIG. 32 is an illustration of a screen indicating a confirmation screen to start identifying an action item, according to an embodiment.

In the above-described embodiment, after the user draws or displays material images, etc., on the drawing screen 140a and presses the icon r1 (see S71) in FIG. 24, the identified area of the action item is identified by the line 262 using the electronic pen 2500 (see S72) in FIG. 26. On the other hand, when the user presses the icon r1 or one of the other icons (see S71), the display control unit 24 may display, on the drawing screen 140a, a confirmation screen 141 illustrated in FIG. 32 before the process proceeds to the processing of S72.

The confirmation screen 141 includes an operation explanation diagram 142 and a comment 143, which explains the operation to be performed by the user, a cancel button 145 to be pressed (selected) not to identify the identified area, and an OK button 146 to be pressed (selected) to identify the identified area. When the user presses the OK button 146, the process proceeds to S72.

As described above, the display control unit 24 once displays the confirmation screen 141 to prompt the user to determine whether to identify an action item or not. This can prevent an erroneous operation in advance.

According to the present embodiment described above, as illustrated in FIG. 26, FIG. 27, and FIG. 28, the user can set an action item, an executor of the action item, and a due date of the action item by using the electronic whiteboard 2 being used in the current meeting.

This makes sure that the action item generated in the meeting is to be performed. In addition, the user does not have to use, for example, the PC 5 to register the action item by accessing a server such as a scheduler, resulting in reduction of the workload of the user.

In addition, as illustrated in FIG. 26, when the user merely draws the line 262 to encloses the image (in this example, "submit minutes") 261 indicating the content of the action item drawn with the electronic pen 2500, the electronic whiteboard 2 recognizes the image 261 as the image of action item, and thus, specifies the content of the action item easily.

Further, as illustrated in FIG. 27, the electronic whiteboard 2 displays the prospective executor list 265 indicating a list of prospective executors of the action item to allow the user to select one of the executors of the action item so that the user does not have to input the executor's name.

Furthermore, as illustrated in FIG. 28, the electronic whiteboard 2 displays the calendar 267 for setting a due date of each action item to allow the user to select the due date of each action item so that the user does not have to input the due date.

According to an embodiment of the disclosure, by simplifying a process of registering an action item, workload of a user can be reduced.

Any one of the above-described operations may be performed in various other ways, for example, in an order different from the one described above.

Although the embodiments of the disclosure have been described and illustrated above, such description is not intended to limit the disclosure to the illustrated embodiments. Numerous additional modifications and variations are possible in light of the above teachings. It is therefore to be understood that, within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC), DSP (digital signal processor), FPGA (field programmable gate array), and conventional circuit components arranged to perform the recited functions.

What is claimed is:

1. A communication terminal communicably connected to a sharing assistant server assisting use of one or more resources to be shared among a plurality of users, the communication terminal comprising:
   circuitry configured to:
   control a display to display, on a screen, a first image relating to an event being executed by one or more users sharing the one or more resources;
   receive identification of an area identified on the screen, the identified area including the first image;
   transmit, to the sharing assistant server, data of the first image included within the identified area, as image data indicating content of an action item generated in the event being executed, in association with event identification information identifying the event being executed; and
   control the display to display, on the screen in response to reception of the identified area, a second image in which a part of the second image is superimposed upon the first image, the second image including a list of prospective executors for executing the action item.

2. The communication terminal according to claim 1, wherein the circuitry is further configured to recognize the identified area according to a user input.

3. The communication terminal according to claim 2, wherein the circuitry is further configured to
   receive selection of an executor, the executor being one or more executors selected from the list of the prospective executors; and
   transmit, to the sharing assistant server, user identification information identifying the executor selected from the list of the prospective executors.

4. The communication terminal according to claim 1, wherein the circuitry is further configured to
   control the display to display, on the screen in response to reception of the identified area, information that requests the one or more users to input a due date of the action item, a part of the information being superimposed upon the first image; and
   transmit, to the sharing assistant server, information on the due date that is input.

5. The communication terminal according to claim 1, wherein the communication terminal includes one of an electronic whiteboard, a videoconference terminal, and a car navigation device.

6. A sharing system, comprising:
   the communication terminal according claim 1; and
   the sharing assistant server, wherein
   the sharing assistant server comprises a memory that stores the data of the first image included within the identified area, in association with the event identification information, which are both transmitted from the communication terminal.

7. A communication method performed by a communication terminal communicably connected to a sharing assistant server assisting use of one or more resources to be shared among a plurality of users, the communication method comprising:
   controlling a display to display, on a screen, a first image relating to an event being executed by one or more users sharing the one or more resources;
   receiving identification of an area identified on the screen, the identified area including the first image;
   transmitting, to the sharing assistant server, data of the first image included within the identified area, as image data indicating content of an action item generated in the event being executed, in association with event identification information identifying the event being executed; and
   controlling the display to display, on the screen in response to reception of the identified area, a second image in which a part of the second image is superimposed upon the first image, the second image including a list of prospective executors for executing the action item.

8. The communication method according to claim 7, further comprising:
   receiving selection of an executor, the executor being one or more executors selected from the list of the prospective executors; and
   transmitting, to the sharing assistant server, user identification information identifying the executor selected from the list of the prospective executors.

9. The communication method according to claim 7, further comprising:
   controlling the display to display, on the screen in response to reception of the identified area, information that requests the one or more users to input a due date of the action item, a part of the information being superimposed upon the first image; and
   transmitting, to the sharing assistant server, information on the due date that is input.

10. A non-transitory recording medium storing a plurality of instructions which, when executed by one or more processors, cause the processors to perform a method, the method comprising:
    controlling a display to display, on a screen, a first image relating to an event being executed by one or more users sharing one or more of the resources;
    receiving identification of an area identified on the screen, the identified area including the first image;
    transmitting, to a sharing assistant server, data of the first image included within the identified area, as image data indicating content of an action item generated in the event being executed, in association with event identification information identifying the event being executed; and
    controlling the display to display, on the screen in response to reception of the identified area, a second image in which a part of the second image is superimposed upon the first image, the second image including a list of prospective executors for executing the action item.

* * * * *